US012645320B2

(12) United States Patent
Shimoshikiryoh et al.

(10) Patent No.: US 12,645,320 B2
(45) Date of Patent: Jun. 2, 2026

(54) LIQUID CRYSTAL DISPLAY DEVICE

(71) Applicant: Sharp Display Technology Corporation, Kameyama City (JP)

(72) Inventors: Fumikazu Shimoshikiryoh, Kameyama City (JP); Takehisa Yoshida, Kameyama City (JP); Shinichi Terashita, Kameyama City (JP); Kouichi Watanabe, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 0 days.

(21) Appl. No.: 18/676,503

(22) Filed: May 29, 2024

(65) Prior Publication Data

US 2025/0004589 A1 Jan. 2, 2025

(30) Foreign Application Priority Data

Jun. 29, 2023 (JP) ................................ 2023-106739

(51) Int. Cl.
| | |
|---|---|
| *G06F 3/041* | (2006.01) |
| *G02F 1/1362* | (2006.01) |
| *G02F 1/1368* | (2006.01) |
| *G06F 3/044* | (2006.01) |

(52) U.S. Cl.
CPC .... *G06F 3/04164* (2019.05); *G02F 1/136286* (2013.01); *G02F 1/1368* (2013.01); *G06F 3/0448* (2019.05)

(58) Field of Classification Search
None
See application file for complete search history.

(56) References Cited

U.S. PATENT DOCUMENTS

| | | | |
|---|---|---|---|
| 6,341,002 B1 | 1/2002 | Shimizu et al. | |
| 2011/0102359 A1* | 5/2011 | Chiba ................... | G06F 3/0412 |
| | | | 345/173 |
| 2017/0285386 A1* | 10/2017 | Ono ..................... | G02F 1/13394 |
| 2018/0024392 A1* | 1/2018 | Park .................. | G02F 1/136227 |
| | | | 349/151 |

(Continued)

FOREIGN PATENT DOCUMENTS

| | | |
|---|---|---|
| JP | 2000122094 A | 4/2000 |
| JP | 2003131268 A | 5/2003 |
| JP | 2021096461 A | 6/2021 |

*Primary Examiner* — Christopher R Lamb
(74) *Attorney, Agent, or Firm* — ScienBiziP, P.C.

(57) ABSTRACT

A liquid crystal display device includes: a first substrate; a second substrate; a liquid crystal layer; a polarizer; and a phase difference layer, the liquid crystal display device further including a plurality of pixels arranged in a matrix, wherein each of the plurality of pixels includes a reflection region, the first substrate includes: a plurality of gate lines; a plurality of source lines; a plurality of thin film transistors; a plurality of pixel electrodes; and a reflective layer, the first substrate further includes: a plurality of touch sensor electrodes; and a plurality of touch lines each electrically connected to a corresponding one of the plurality of touch sensor electrodes, the reflective layer is divided into a plurality of reflective segments that are electrically independent from each other, and each of the plurality of reflective segments overlaps two or more of the plurality of pixel electrodes in a plan view.

25 Claims, 21 Drawing Sheets

(56) References Cited

U.S. PATENT DOCUMENTS

| | | | |
|---|---|---|---|
| 2019/0018271 A1* | 1/2019 | Xie | G06F 3/0412 |
| 2021/0181576 A1 | 6/2021 | Sasaki et al. | |
| 2021/0223641 A1* | 7/2021 | Bai | G02F 1/136213 |

* cited by examiner

PE

LIQUID CRYSTAL DISPLAY DEVICE

CROSS-REFERENCE TO RELATED APPLICATION

The present application claims priority from Japanese Application JP2023-106739, the content to which is hereby incorporated by reference into this application.

BACKGROUND

1. Field

The disclosure relates to liquid crystal display devices.

2. Description of the Related Art

Liquid crystal display devices are generally classified into transmissive liquid crystal display devices and reflective liquid crystal display devices. A transmissive liquid crystal display device produces a display in transmission mode by using the light emitted by the backlight. A reflective liquid crystal display device produces a display in reflection mode by using ambient light. Incidentally, liquid crystal display devices have been proposed that have both a reflection region where the pixels produce a display in reflection mode and a transmission region where the pixels produce a display in transmission mode. Such a liquid crystal display device is called a transflective liquid crystal display device or a transmission/reflection combination type of liquid crystal display device.

Reflective liquid crystal display devices and transflective liquid crystal display devices are suitably used as, for example, small to medium-sized mobile display devices for outdoor use. The reflective liquid crystal display device is disclosed, for example, in Japanese Unexamined Patent Application Publication No. 2000-122094. The transflective liquid crystal display device is disclosed, for example, in Japanese Unexamined Patent Application Publication No. 2003-131268. In addition, Japanese Unexamined Patent Application Publication No. 2021-96461 proposes a liquid crystal display device capable of improving the brightness of a reflective display. The reflective or transflective liquid crystal display device disclosed in Japanese Unexamined Patent Application Publication No. 2021-96461 exhibits improved reflectance owing to a double-electrode structure in which a reflective electrode (reflective layer) and a transparent electrode (pixel electrode) are separated by an interlayer insulating layer.

In addition, liquid crystal display devices used in, for example, smartphones and tablet computers have a touch sensor function. Known touch sensors come in various types including resistive film types, electrostatic types, and optical types.

Liquid crystal display devices equipped with touch sensors (hereinafter, referred to as touch panels) are classified roughly into those liquid crystal display devices with external touch sensors (external types) and those liquid crystal display devices with built-in touch sensors (built-in types). Built-in type touch panels are more convenient in, for example, their small thickness and lightweight than external-type touch panels and advantageously allows for increased light transmittance.

Built-in type touch panels come in on-cell types and in-cell types. The term, "cell," in this context refers to a display panel. The display panel includes an active matrix substrate (TFT substrate), an opposite substrate disposed opposite the TFT substrate, and a liquid crystal layer provided between the TFT substrate and the opposite substrate. In in-cell types, the display panel includes therein a layer that delivers the touch sensor function. In on-cell types, the layer that delivers the touch sensor function is disposed between the display panel and a polarizer that is provided on the viewer side of the display panel.

SUMMARY

One can build an in-cell type of touch panel that is the theoretically thinnest and lightweight. In addition, as described above, liquid crystal display devices capable of reflection mode displays are suited to outdoor use. An in-cell type touch panel capable of displaying in reflection mode is hence desired, but not yet realized.

The disclosure, in an embodiment thereof, has been made in view of these issues and has an object to provide a pixel structure suitable for liquid crystal display devices capable of displaying in reflection mode and also capable of being used as an in-cell type touch panel.

The present specification discloses liquid crystal display devices described in the following items.

Item 1

A liquid crystal display device including:

a first substrate;

a second substrate closer to a viewer side than the first substrate;

a liquid crystal layer between the first substrate and the second substrate;

a polarizer closer to the viewer side than the liquid crystal layer; and a phase difference layer between the polarizer and the liquid crystal layer, the liquid crystal display device further including a plurality of pixels arranged in a matrix of a plurality of rows and a plurality of columns, wherein each of the plurality of pixels includes a reflection region in which a display is produced in reflection mode, the first substrate includes:

a plurality of gate lines extending in a row direction;

a plurality of source lines extending in a column direction;

a plurality of thin film transistors each provided corresponding to each of the plurality of pixels;

a plurality of pixel electrodes each electrically connected to a corresponding one of the plurality of thin film transistors; and a reflective layer made of a conductive material and located in at least the reflection region and opposite the liquid crystal layer with respect to the plurality of pixel electrodes, the first substrate further includes:

a plurality of touch sensor electrodes to each of which different signals can be applied; and a plurality of touch lines each electrically connected to a corresponding one of the plurality of touch sensor electrodes, the reflective layer is divided into a plurality of reflective segments that are electrically independent from each other, and each of the plurality of reflective segments overlaps two or more of the plurality of pixel electrodes in a plan view.

Item 2

The liquid crystal display device of item 1, wherein the two or more of the plurality of pixel electrodes overlapping each of the plurality of reflective segments are arranged in a plurality of rows and a plurality of columns.

Item 3

The liquid crystal display device of item 1 or 2, wherein the plurality of reflective segments are equal in number to, or greater in number than, the plurality of touch sensor electrodes.

Item 4

The liquid crystal display device of any of items 1 to 3, wherein different voltages can be applied to the plurality of reflective segments.

Item 5

The liquid crystal display device of item 4, wherein each of the plurality of reflective segments is electrically connected to a corresponding one of the plurality of touch sensor electrodes and to a corresponding one of the plurality of touch lines.

Item 6

The liquid crystal display device of item 5, wherein each of the plurality of reflective segments is electrically connected to the corresponding one of the plurality of touch sensor electrodes via at least one first contact hole and also to the corresponding one of the plurality of touch lines via at least one second contact hole.

Item 7

The liquid crystal display device of item 6, wherein the at least one first contact hole is a plurality of first contact holes and/or the at least one second contact hole is a plurality of second contact holes.

Item 8

The liquid crystal display device of item 6 or 7, wherein the at least one first contact hole is provided in a different location than the at least one second contact hole in a plan view.

Item 9

The liquid crystal display device of item 8, wherein any one of the at least one first contact hole is separated by an equivalent of one or more pixels from each of the at least one second contact hole in both or either of the row direction and the column direction.

Item 10

The liquid crystal display device of any of items 6 to 9, wherein the at least one first contact hole is a plurality of first contact holes, and any one of the plurality of first contact holes is provided in a different location than another one of the plurality of first contact holes in a plan view.

Item 11

The liquid crystal display device of item 10, wherein any one of the plurality of first contact holes is separated by an equivalent of one or more pixels from another one of the plurality of first contact holes in both or either of the row direction and the column direction.

Item 12

The liquid crystal display device of any of items 6 to 11, wherein the at least one second contact hole is a plurality of second contact holes, and any one of the plurality of second contact holes is provided in a different location than another one of the plurality of second contact holes in a plan view.

Item 13

The liquid crystal display device of item 12, wherein any one of the plurality of second contact holes is separated by an equivalent of one or more pixels from another one of the plurality of second contact holes in both or either of the row direction and the column direction.

Item 14

The liquid crystal display device of any of items 6 to 13, wherein at least one of the at least one first contact hole and the at least one second contact hole is located between adjacent pixel electrodes in the plurality of pixel electrodes.

Item 15

The liquid crystal display device of any of items 1 to 14, wherein at least one of the plurality of touch lines overlaps a region between adjacent reflective segments in the plurality of reflective segments in a plan view.

Item 16

The liquid crystal display device of any of items 1 to 15, wherein a region between adjacent touch sensor electrodes in the plurality of touch sensor electrodes overlaps a region between adjacent pixel electrodes in the plurality of pixel electrodes in a plan view.

Item 17

The liquid crystal display device of any of items 1 to 16, wherein each of the plurality of reflective segments overlaps a region between adjacent touch sensor electrodes in the plurality of touch sensor electrodes and a region between adjacent pixel electrodes in the plurality of pixel electrodes in a plan view.

Item 18

The liquid crystal display device of any of items 1 to 17, wherein the plurality of touch lines adjoin a bottom face of the reflective layer via a first insulating layer, and the plurality of touch sensor electrodes or the plurality of pixel electrodes adjoin a top face of the reflective layer via a second insulating layer.

Item 19

The liquid crystal display device of any of items 1 to 18, wherein each of the plurality of touch lines is disposed either between adjacent gate lines in the plurality of gate lines or between adjacent source lines in the plurality of source lines.

Item 20

The liquid crystal display device of any of items 1 to 19, wherein the plurality of touch lines are formed from a same conductive film as either the plurality of gate lines or the plurality of source lines.

Item 21

The liquid crystal display device of any of items 1 to 20, wherein each of the plurality of pixels includes a transmission region in which a display is produced in transmission mode, each of the plurality of reflective segments has an opening in the transmission region, and the liquid crystal display device includes:

a light source and another polarizer both closer to a rear side than the first substrate; and another phase difference layer between the other polarizer and the liquid crystal layer.

Item 22

The liquid crystal display device of any of items 1 to 21, wherein the first substrate further includes an insulating layer formed so as to cover the plurality of reflective segments, each of the plurality of reflective segments has an irregular surface structure, and the insulating layer has a thickness greater than a difference in height of the irregular surface structure.

Item 23

The liquid crystal display device of item 22, wherein the thickness of the insulating layer is at least twice the difference in height of the irregular surface structure.

Item 24

The liquid crystal display device of item 22 or 23, wherein
a part of the insulating layer that overlaps the irregular
surface structure of the plurality of reflective segments
has a top face that has an irregular shape, and
the irregular shape of the insulating layer has a difference
in height that is less than or equal to half the difference
in height of the irregular surface structure of the
plurality of reflective segments.

Item 25

The liquid crystal display device of any of items 1 to 24,
wherein
the plurality of touch sensor electrodes are adjacent to the
plurality of pixel electrodes via a dielectric layer, and
either or both of the plurality of touch sensor electrodes
and the plurality of pixel electrodes have at least one
slit.

Item 26

The liquid crystal display device of any of items 1 to 25,
wherein
the first substrate includes a first horizontal alignment film
in contact with the liquid crystal layer,
the second substrate includes a second horizontal align-
ment film in contact with the liquid crystal layer,
the liquid crystal layer is twist-aligned in absence of
applied voltage, and
the liquid crystal layer has a twist angle of from 45° to 90°
both inclusive in absence of applied voltage.

Item 27

The liquid crystal display device of any of items 1 to 26,
wherein a substantially same voltage is applied to the
plurality of reflective segments at a substantially same
timing.

Item 28

The liquid crystal display device of any of items 1 to 26,
wherein a substantially same voltage is applied at a sub-
stantially same timing to a group of pixel electrodes in the
plurality of pixel electrodes that is located either in a same
pixel row or in a same pixel column and to one or more of
the plurality of reflective segments that overlap(s) the group
of pixel electrodes in a plan view.

Item 29

The liquid crystal display device of any of items 1 to 28,
wherein the reflective layer is located between the liquid
crystal layer and the plurality of thin film transistors and at
least partially overlaps the plurality of thin film transistors in
a plan view.

The disclosure, in an embodiment thereof, can provide a
pixel structure suitable for liquid crystal display devices
capable of displaying in reflection mode and also capable of
being used as an in-cell type touch panel.

DESCRIPTION OF EMBODIMENTS

The following will describe embodiments of the disclo-
sure with reference to drawings. Note that the embodiments
of the disclosure are not limited to those described below.

Embodiment 1

Figure 1:
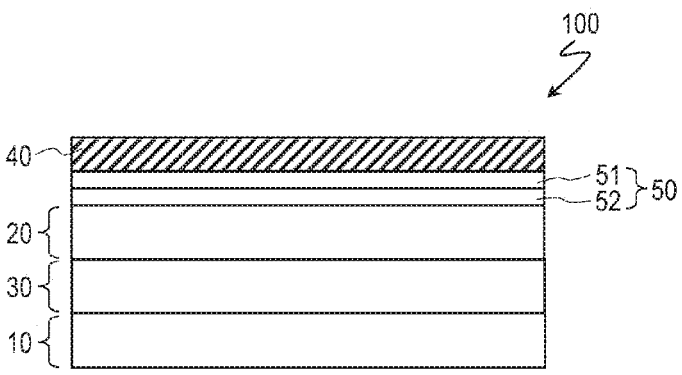
FIG. 1 is a schematic cross-sectional view of a liquid
crystal display device 100 in accordance with an embodi-
ment of the disclosure.
Figure 2:
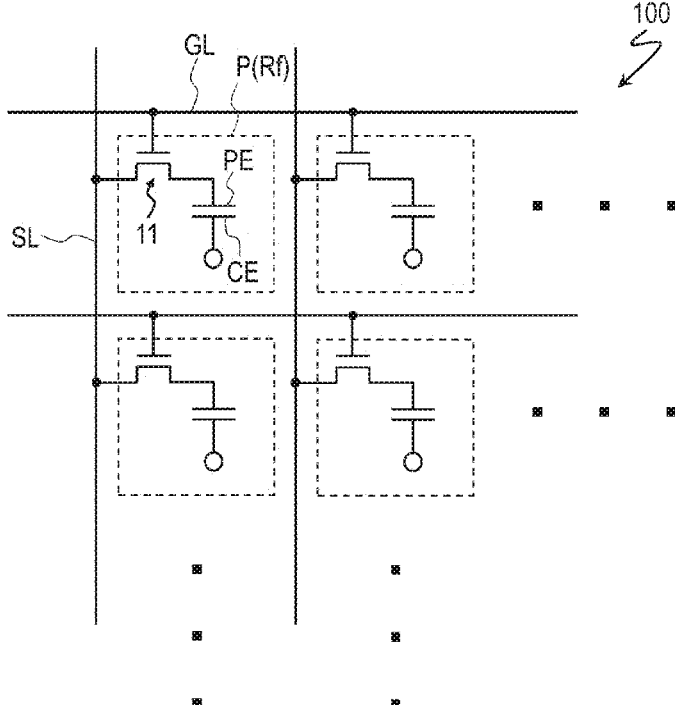
FIG. 2 is an equivalent circuit diagram of a plurality of
pixels P in the liquid crystal display device 100.

A description is given of a liquid crystal display device
100 in accordance with the present embodiment with refer-
ence to FIGS. 1 and 2. The liquid crystal display device 100
is a reflective liquid crystal display device that displays in normally black mode. FIG. 1 is a schematic cross-sectional view of the liquid crystal display device 100. FIG. 2 is an equivalent circuit diagram of a plurality of pixels P in the liquid crystal display device 100.

Referring to FIG. 1, the liquid crystal display device 100 includes: an active matrix substrate (hereinafter, "TFT substrate") 10; an opposite substrate (may be referred to as a "color filter substrate") 20 disposed closer to the viewer side than the TFT substrate 10; and a liquid crystal layer 30 provided between the TFT substrate 10 and the opposite substrate 20. The liquid crystal display device 100 further includes: a polarizer 40 disposed closer to the viewer side than the liquid crystal layer 30; and a phase difference layer 50 disposed between the polarizer 40 and the liquid crystal layer 30. In this context, the polarizer 40 is disposed closer to the viewer side than the opposite substrate 20, and the phase difference layer 50 is disposed between the polarizer 40 and the opposite substrate 20. The polarizer 40 is, specifically, an absorptive linear polarizer. In the example shown in FIG. 1, the phase difference layer 50 includes a $\lambda/2$ plate 51 and a $\lambda/4$ plate 52.

Referring to FIG. 2, the liquid crystal display device 100 further includes the plurality of pixels P. The plurality of pixels P are arranged in a matrix with a plurality of rows and a plurality of columns. The plurality of pixels P typically include red pixels for producing a red display, green pixels for producing a green display, and blue pixels for producing a blue display. The liquid crystal display device 100 is a reflective type as described above. Therefore, each pixel P has a reflection region Rf for producing a display in reflection mode.

The TFT substrate 10 includes: a plurality of gate lines (scan lines) GL; a plurality of source lines (signal lines) SL; a plurality of thin film transistors (TFTs) 11; a plurality of pixel electrodes PE; and a common electrode CE.

The plurality of gate lines GL extend in the row direction. Each gate line GL supplies a gate signal (scan signal) to an associated one of the TFTs 11. The plurality of source lines SL extend in the column direction which intersect with the row direction (e.g., which is substantially perpendicular to the row direction). Each source line SL supplies a source signal (display signal) to an associated one of the TFTs 11.

The plurality of TFTs 11 are provided corresponding to the respective pixels P. The gate electrode and the source electrode of each TFT 11 are electrically connected respectively to an associated one of the gate lines GL and an associated one of the source lines SL. Each of the plurality of pixel electrodes PE is electrically connected to an associated one of the TFTs 11 (more specifically, to the drain electrode of an associated one of the TFTs 11).

The common electrode CE can generate an in-plane electric field (fringe electric field) across the liquid crystal layer 30 when used in combination with the pixel electrode PE. The common electrode CE is divided into a plurality of segments as described later.

Figure 3:
FIG. 3 is a schematic cross-sectional view of the liquid
crystal display device 100.

A description is given next of more specific structures of the TFT substrate 10 and the opposite substrate 20 with reference to FIG. 3 and FIGS. 4A to 4G. FIG. 3 is a schematic cross-sectional view of the liquid crystal display device 100. Each of FIGS. 4A to 4G is a schematic plan view of a layer in the TFT substrate 10.

The TFT substrate 10 includes a substrate 10a, the TFTs 11, a first interlayer insulating layer 12, and a reflective layer 13. In addition, the TFT substrate 10 further includes a second interlayer insulating layer 14, the pixel electrode PE, a dielectric layer 15, the common electrode CE, and a first horizontal alignment film 19. FIGS. 4A to 4G show a back plane circuit BP including the TFTs 11, the first interlayer insulating layer 12, the reflective layer 13, the second interlayer insulating layer 14, the pixel electrode PE, the dielectric layer 15, and the common electrode CE respectively in an area corresponding to 8 rows and 11 columns of the pixels P.

The substrate 10a supports, for example, the TFTs 11. The substrate 10a is transparent and electrically insulating. The substrate 10a is, for example, a glass substrate or a plastic substrate.

The TFTs 11 are provided on the substrate 10a. The TFTs 11 are provided corresponding to the respective pixels P. Each TFT 11 includes a gate electrode GE, a gate insulating layer GI, a semiconductor layer SC, a source electrode SE, and a drain electrode DE. The gate electrode GE is electrically connected to an associated one of the gate lines GL, and the source electrode SE is electrically connected to an associated one of the source lines SL. The drain electrode DE is electrically connected to the pixel electrode PE. The circuit including, for example, the TFTs 11, the gate lines GL, and the source lines SL to drive the plurality of pixels P is sometimes referred to as the back plane circuit BP. Note that although FIG. 3 shows the TFTs 11 as having a bottom-gate structure, the TFTs 11 may alternatively have a top-gate structure or a double-gate structure.

The first interlayer insulating layer 12 is provided so as to cover the back plane circuit BP. The first interlayer insulating layer 12 is made of an organic insulating material and may be made of, for example, a photosensitive resin.

The reflective layer 13 is disposed on the first interlayer insulating layer 12 so as to reside at least in the reflection region Rf. In other words, the reflective layer 13 is disposed on the back plane circuit BP via the first interlayer insulating layer 12. In other words, the first interlayer insulating layer 12 is disposed between the reflective layer 13 and the TFT 11. Again, in other words, the reflective layer 13 is adjacent to the TFT 11 via at least the first interlayer insulating layer 12.

The reflective layer 13 is made of a conductive material that is reflective to light. The reflective layer 13 is made of, more specifically, a metal material with a high reflectance. The reflective layer 13 may be made of, for example, a silver alloy, aluminum, or an aluminum alloy.

The reflective layer 13 has an irregular surface. In other words, the reflective layer 13 has an irregular surface structure. The irregular surface structure of the reflective layer 13 is sometimes referred to as an MRS (micro reflective structure) and provided to diffusely reflect ambient light to produce a display that is close to paper white. The irregular surface structure may have a plurality of protrusions p that are randomly arranged, for example, such that the centers of adjacent protrusions p are separated by a distance of 5 μm to 50 μm both inclusive, preferably by a distance of 10 μm to 20 μm both inclusive. The protrusions p have a substantially circular or polygonal shape when viewed normal to the substrate 10a. The protrusions p account for, as an example, from approximately 20% to 40% of the pixels P in area. The protrusions p have a height of, for example, 1 μm to 5 μm both inclusive.

The irregular surface structure of the reflective layer 13 may be formed by any method. For example, as shown in the drawing(s), by forming the first interlayer insulating layer 12 with an irregular surface structure and forming the reflective layer 13 thereon, the reflective layer 13 can be provided on the surface thereof with an irregular shape that reflects the irregular surface structure of the first interlayer insulating layer 12. The first interlayer insulating layer 12 with such an irregular surface structure can be formed by a method disclosed in, for example, Japanese Patent No. 3394926.

In addition, the reflective layer 13 is positioned between the liquid crystal layer 30 and the TFTs 11. Additionally, the reflective layer 13 at least partially overlaps the TFT 11 when viewed normal to the display screen (i.e., in a plan view).

The second interlayer insulating layer 14 is provided on the first interlayer insulating layer 12 so as to cover the reflective layer 13. Therefore, the reflective layer 13 can be described as being provided between the first interlayer insulating layer 12 and the second interlayer insulating layer 14. The second interlayer insulating layer 14 is a planarization layer, made of an organic insulating material and may be made of, for example, a photosensitive resin.

Each of the plurality of pixels P includes a pixel electrode PE. In addition, the pixel electrodes PE are provided on the second interlayer insulating layer 14. In other words, the pixel electrode PE is adjacent to the top face of the reflective layer 13 via the second interlayer insulating layer 14. In other words, the second interlayer insulating layer 14 is disposed between the pixel electrode PE and the reflective layer 13. Again, in other words, the reflective layer 13 is adjacent to the pixel electrode PE via at least the second interlayer insulating layer 14 and positioned opposite the liquid crystal layer 30 with respect to the pixel electrode PE (i.e., closer to the rear side than the pixel electrode PE).

The pixel electrode PE is made of a transparent conductive material. The transparent conductive material may be, for example, indium tin oxide (ITO), indium zinc oxide (IZO®), or a mixture of these materials. The pixel electrode PE is electrically connected to the TFT 11.

In the example shown in the drawing(s), the pixel electrode PE is electrically connected to the drain electrode DE of the TFT 11 via a contact electrode 16. The contact electrode 16 may be made from the same metal film as the reflective layer 13 (i.e., in the same layer as the reflective layer 13). The first interlayer insulating layer 12 has a drain contact hole CHD for exposing at least a part of the drain electrode DE of the TFT 11, and the contact electrode 16 is connected to the drain electrode DE of the TFT 11 in the drain contact hole CHD. In addition, the second interlayer insulating layer 14 has a pixel contact hole CHp for exposing a part of the contact electrode 16, and the pixel electrode PE is connected to the contact electrode 16 in the pixel contact hole CHp. Note that there is provided an opening 130 in a region of the reflective layer 13 that overlaps the drain contact hole CHD and the pixel contact hole CHp.

As described here, the pixel electrode PE is connected to the TFT 11 via both the drain contact hole CHD and the pixel contact hole CHp. The center of the drain contact hole CHD does not overlap the center of the pixel contact hole CHp in a plan view. In addition, in this context, the drain contact hole CHD does not overlap the pixel contact hole CHp in a plan view.

The dielectric layer 15 is provided so as to cover the pixel electrode PE. The dielectric layer 15 is made of, for example, an inorganic insulating material.

The common electrode CE is provided on the dielectric layer 15. In other words, the common electrode CE is adjacent to the pixel electrode PE via the dielectric layer 15. The common electrode CE is made of a transparent conductive material. The common electrode CE may be made of the same transparent conductive material as the pixel electrode PE. Note that the common electrode CE has, in each pixel P, a plurality of stripe-like portions and at least one slit between two adjacent stripe-like portions (not shown in FIGS. 3 and 4G). The provision of the slit in the common electrode CE enables generating a fringe electric field (in-plane electric field) across the liquid crystal layer 30 in accordance with the electrical potential difference between the pixel electrode PE and the common electrode CE.

The first horizontal alignment film 19 is provided on the common electrode CE and in contact with the liquid crystal layer 30. Therefore, the pixel electrode PE and the common electrode CE may be described as being provided between the second interlayer insulating layer 14 and the first horizontal alignment film 19. In addition, the dielectric layer 15 may also be described as being provided between the second interlayer insulating layer 14 and the first horizontal alignment film 19. In this example, the pixel electrode PE is provided between the second interlayer insulating layer 14 and the dielectric layer 15, and the common electrode CE is provided between the dielectric layer 15 and the first horizontal alignment film 19.

The opposite substrate 20 includes a substrate 20a, a color filter layer 21, and a second horizontal alignment film 29. In addition, the opposite substrate 20 further includes a plurality of columnar spacers (not shown here).

The substrate 20a supports, for example, the color filter layer 21. The substrate 20a is transparent and electrically insulating. The substrate 20a is, for example, a glass substrate or a plastic substrate.

The color filter layer 21 typically includes red color filters disposed in regions corresponding to the red pixels, green color filters disposed in regions corresponding to the green pixels, and blue color filters disposed in regions corresponding to the blue pixels. The red color filter, the green color filter, and the blue color filter transmit red light, green light, and blue light respectively.

Note that the color filter layer 21 is omitted when no color display is to be performed.

There may be provided an overcoat layer (planarization layer) covering the color filter layer 21 if necessary. In addition, a white display may appear yellowish depending on the transparent conductive material used (for the pixel electrode PE and the common electrode CE), the organic insulating material used (for the first interlayer insulating layer 12 and the second interlayer insulating layer 14), the inorganic insulating material used (for the dielectric layer 15), and the alignment film material used (for the first horizontal alignment film 19 and the second horizontal alignment film 29). In such a case, the chromaticity of white display may be changed toward, for example, the chromaticity of a D65 light source by forming the overcoat layer from a blue resist for chromaticity adjustment (shifting toward blue).

The columnar spacers specify the thickness (cell gap) of the liquid crystal layer 30. The columnar spacers may be made of a photosensitive resin.

The second horizontal alignment film 29 is provided on the color filter layer 21 and in contact with the liquid crystal layer 30.

The liquid crystal layer 30 contains either a nematic liquid crystal material with positive dielectric anisotropy $\Delta\varepsilon$ (i.e., of a positive type) or a nematic liquid crystal material with negative dielectric anisotropy $\Delta\varepsilon$ (i.e., of a negative type). Dielectric anisotropy $\Delta\varepsilon$ is a difference between the permittivity $\varepsilon_{/}$ in the major axis direction and the permittivity $\varepsilon_{\perp}$ in the minor axis direction of liquid crystal molecules 31 (i.e., $\varepsilon_{/}\text{-}\varepsilon_{\perp}$). The liquid crystal layer 30 may further contain a chiral agent if necessary. The liquid crystal layer 30 may be made by, for example, a dropping method. The thickness of the liquid crystal layer 30 is not limited in any particular manner.

The first horizontal alignment film 19 and the second horizontal alignment film 29 are subjected to respective alignment processes to specify the alignment of the liquid crystal molecules 31 in the liquid crystal layer 30. The alignment direction specified by the first horizontal alignment film 19 differs from the alignment direction specified by the second horizontal alignment film 29.

Since the first horizontal alignment film 19 and the second horizontal alignment film 29 are disposed on both sides of the liquid crystal layer 30, the liquid crystal molecules 31 in the liquid crystal layer 30 are aligned horizontally at least in the absence of applied voltage across the liquid crystal layer 30 (i.e., the pretilt angle is practically) 0°. Since the alignment direction specified by the first horizontal alignment film 19 differs from the alignment direction specified by the second horizontal alignment film 29 as described above, the liquid crystal layer 30 is twist-aligned in the absence of applied voltage as shown in FIG. 3. As a voltage is applied across the liquid crystal layer 30, in other words, as the pixel electrode PE and the common electrode CE generate an in-plane electric field (fringe electric field) across the liquid crystal layer 30, this in-plane electric field changes the alignment of the liquid crystal layer 30.

In the liquid crystal display device 100 in accordance with the present embodiment, the common electrode CE is divided into a plurality of segments TX. Since the plurality of segments TX can be placed under different signals (voltages) from each other, the plurality of segments TX can function as "touch sensor electrodes" in the in-cell type touch panel. In other words, the TFT substrate 10 in the liquid crystal display device 100 includes a plurality of touch sensor electrodes TX. Each touch sensor electrode TX is provided corresponding to two or more of the pixels P.

Figure 4A:
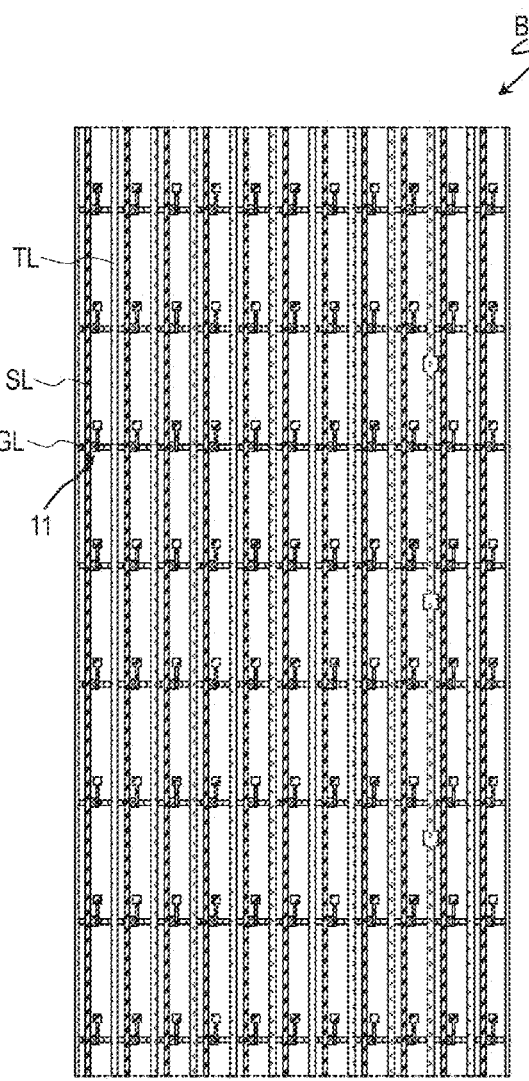
FIG. 4A is a schematic plan view of a back plane circuit
BP on a TFT substrate 10 in the liquid crystal display device
100.
Figure 4B:
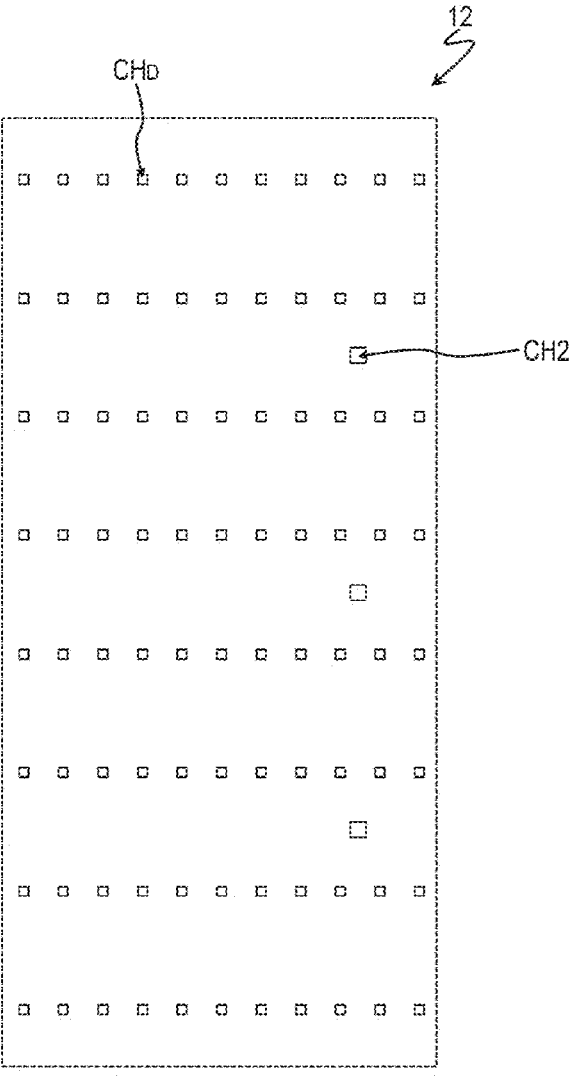
FIG. 4B is a schematic plan view of a first interlayer
insulating layer 12 in the TFT substrate 10.

In addition, the TFT substrate 10 further includes a plurality of touch lines TL. Each of the plurality of touch lines TL is electrically connected to an associated one of the plurality of touch sensor electrodes TX. Here, the plurality of touch lines TL extend in the column direction (in the same direction as the source lines SL) as shown in FIG. 4A, and each touch line TL is disposed between adjacent source lines SL. In addition, here, the plurality of touch lines TL are made from the same conductive film as the plurality of source lines SL (i.e., in the same layer as the plurality of source lines SL). Therefore, the plurality of touch lines TL are covered by the first interlayer insulating layer 12 and adjoin the bottom face of the reflective layer 13 via the first interlayer insulating layer 12.

The plurality of touch lines TL are connected to a touch-drive unit provided in a non-display area. The touch-drive unit is configured, for example, to switch in time division between a display mode in which the plurality of touch sensor electrodes TX are caused to function as the common electrode CE and a touch detection mode in which the plurality of touch sensor electrodes TX are caused to function as the touch sensor electrodes TX. The touch-drive unit, for example, applies a common signal to the touch sensor electrodes TX (common electrode CE) through the touch lines TL in the display mode. Meanwhile, in the touch detection mode, the touch-drive unit applies a touch drive signal to the touch sensor electrodes TX through the touch lines TL.

Figure 4C:
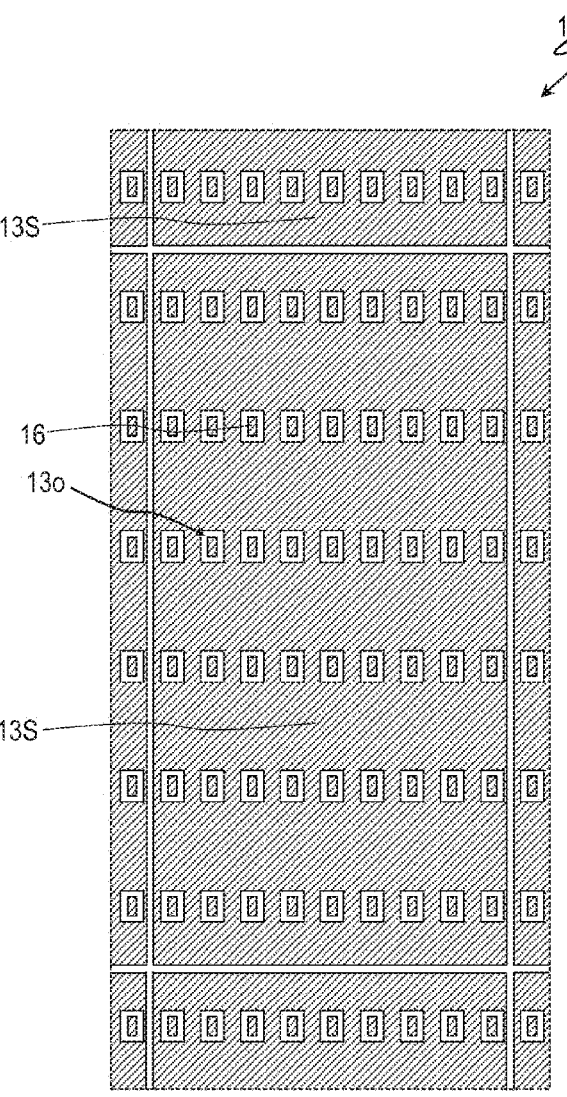
FIG. 4C is a schematic plan view of a reflective layer 13
in the TFT substrate 10.
Figure 4D:
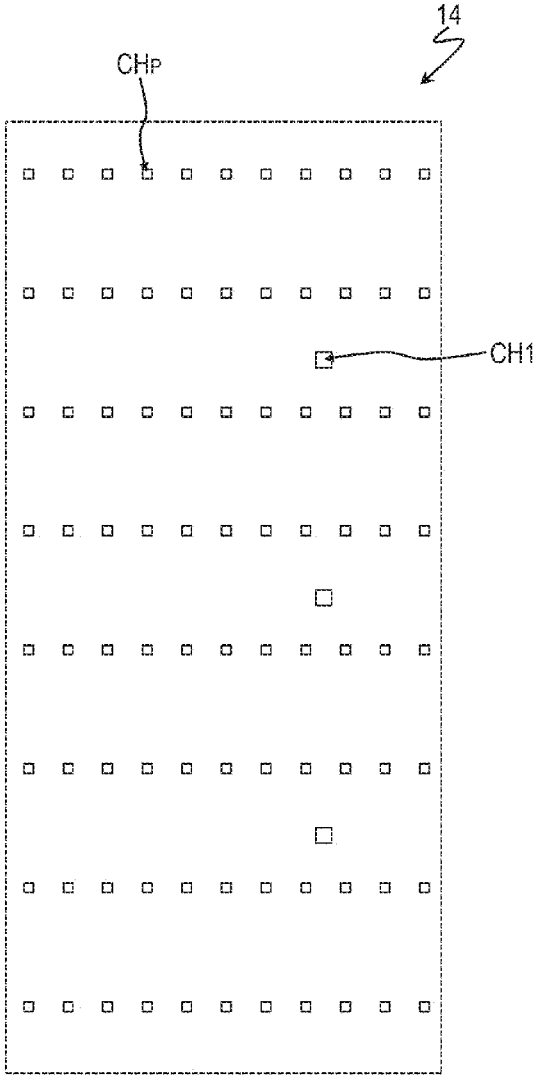
FIG. 4D is a schematic plan view of a second interlayer
insulating layer 14 in the TFT substrate 10.
Figure 4E:
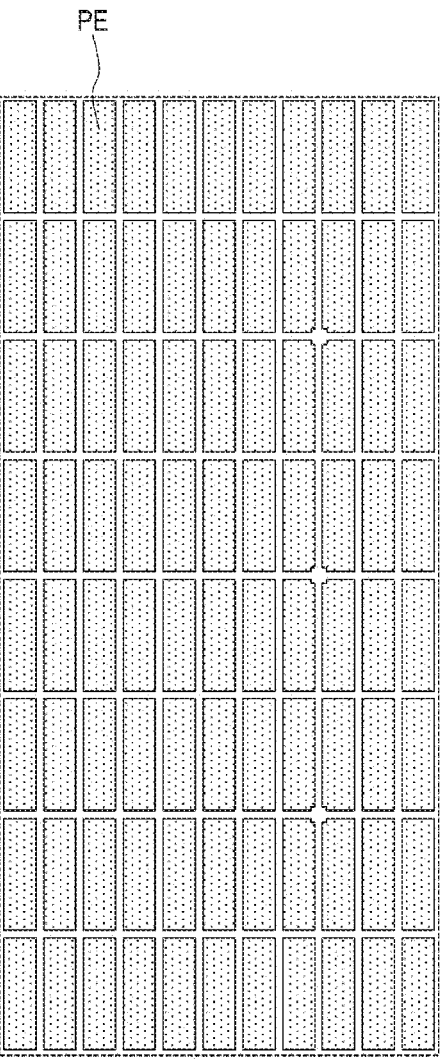
FIG. 4E is a schematic plan view of a pixel electrode PE
in the TFT substrate 10.
Figure 4F:
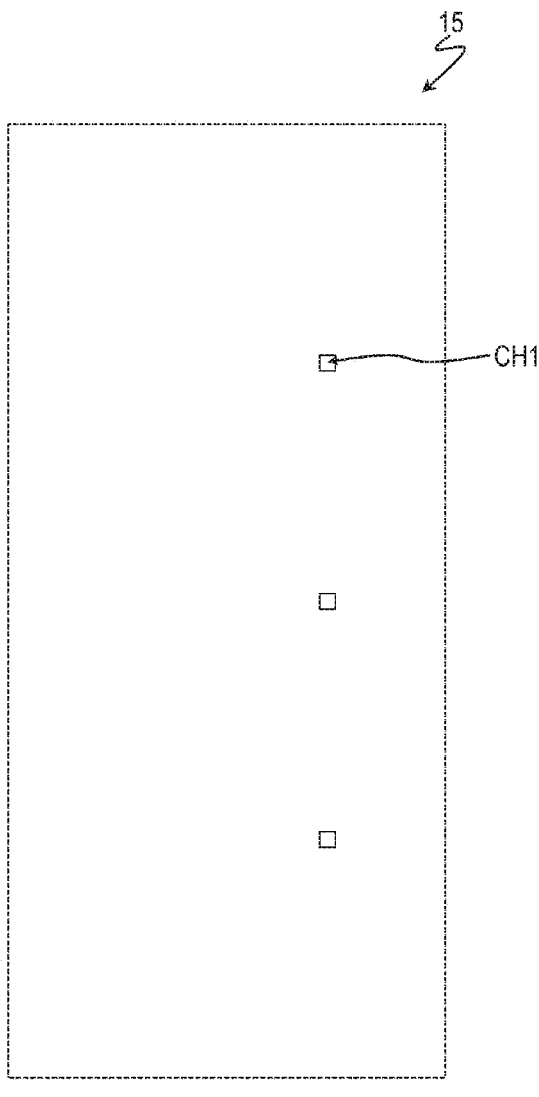
FIG. 4F is a schematic plan view of a dielectric layer 15
in the TFT substrate 10.
Figure 4G:
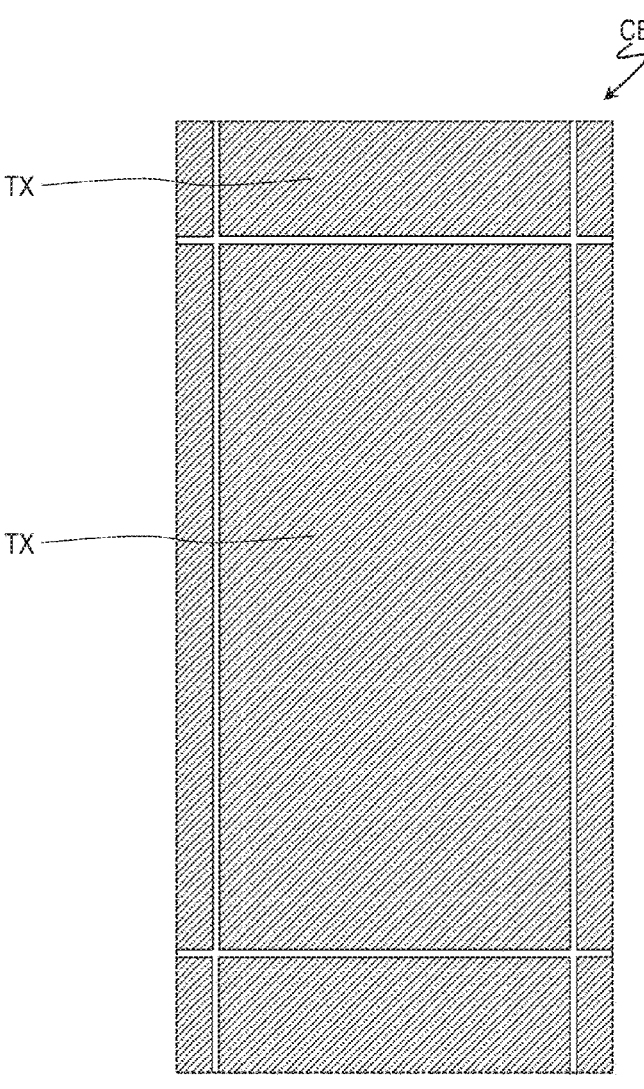
FIG. 4G is a schematic plan view of a common electrode
CE in the TFT substrate 10.

In addition, in the liquid crystal display device 100 in accordance with the present embodiment, the reflective layer 13 is divided into a plurality of reflective segments 13S that are electrically independent from each other. Each of the plurality of reflective segments 13S overlaps two or more of the plurality of pixel electrodes PE in a plan view. Here, the two or more pixel electrodes PE overlapping the reflective segment 13S are arranged in a plurality of rows and a plurality of columns. FIG. 4C shows an example where 54 pixel electrodes PE arranged in 6 rows and 9 columns overlap each reflective segment 13S.

The number of the reflective segments 13S is greater than or equal to the number of the touch sensor electrodes TX. Although an example where the number of the reflective segments 13S is equal to the number of the touch sensor electrodes TX is shown in the drawing(s) here, the reflective segments 13S may outnumber the touch sensor electrodes TX. In other words, the reflective layer 13 may be divided more than the common electrode CE.

The plurality of reflective segments 13S can be placed under different voltages. Each reflective segment 13S is electrically connected to an associated one of the plurality of touch sensor electrodes TX and to an associated one of the plurality of touch lines TL.

A plurality of first contact holes CH1 are formed across both the second interlayer insulating layer 14 and the dielectric layer 15, and a plurality of second contact holes CH2 are formed in the first interlayer insulating layer 12. Each reflective segment 13S is electrically connected to an associated one of the touch sensor electrodes TX via at least one of the first contact holes CH1 and also to an associated one of the touch lines TL via at least one of the second contact holes CH2. In the example shown in the drawing(s), each reflective segment 13X is electrically connected to an associated one of the touch sensor electrodes TX via a plurality (specifically, three) of first contact holes CH1 and also to an associated one of the touch lines TL via a plurality (specifically, three) of second contact holes CH2.

As described here, each reflective segment 13S is electrically connected to an associated one of the touch sensor electrodes TX and an associated one of the touch lines TL. In other words, the touch sensor electrodes TX are electrically connected to the touch lines TL via the reflective segments 13S.

As described above, in the liquid crystal display device 100 in accordance with the present embodiment, the reflective layer 13 is divided into the plurality of reflective segments 13S which are electrically independent from each other. Therefore, the loads of the touch sensor electrodes TX (the parasitic capacitance formed by the touch sensor electrodes TX and the reflective segments 13S) can be reduced when compared with a case where the reflective layer 13 is not divided.

Note that although the present embodiment discusses an example where different voltages are applied to the plurality of reflective segments 13S, the reflective segments 13S may not be electrically connected to other members and can be electrically floated. This structure of the present embodiment where different voltages are applied to the plurality of reflective segments 13S allows for further reduction of the loads of the touch sensor electrodes TX. For example, as disclosed in the example of the present embodiment, if the reflective segments 13S are electrically connected to the touch sensor electrodes TX, one can enjoy more freedom in wiring design of the touch sensor electrodes TX because the reflective segments 13S do not form electrical load to the touch sensor electrodes TX.

If a configuration is employed in which each reflective segment 13S is electrically connected to the touch sensor electrode TX via at least one of the first contact holes CH1 and also to the touch line TL via at least one of the second contact holes CH2, the surface of the touch sensor electrode TX (common electrode CE) exhibits improved flatness, and decreases in the contrast ratio due to the contact holes are restrained, when compared with a configuration in which the touch sensor electrode TX is directly connected to the touch line TL (configuration in which contact holes are formed across the first interlayer insulating layer 12, the second interlayer insulating layer 14, and the dielectric layer 15).

By disposing at least one of the first contact holes CH1 corresponding to each reflective segment 13S and at least one of the second contact holes CH2 corresponding to each reflective segment 13S in different locations in a plan view, the surface of the touch sensor electrode TX exhibits improved flatness, and decreases in the contrast ratio due to the contact holes are restrained. With a view to restraining decreases in the contrast ratio, any one of at least one of the first contact holes CH1 corresponding to each reflective segment 13S is preferably separated from each of at least one of the second contact holes CH2 by an equivalent of one or more pixels in one or both of the row direction and the column direction.

A configuration is employed in which the number of the first contact holes CH1 for electrically connecting each reflective segment 13S to the touch sensor electrode TX is two or greater and/or the number of the second contact holes CH2 for electrically connecting each reflective segment 13X to the touch line TL is two or greater allows for redundancy in the electrical connection between the reflective segment 13S and the touch sensor electrode TX and/or redundancy in the electrical connection between the reflective segment 13S and the touch line TL. In addition, such a configuration also enables, for example, reducing the resistivity of the touch line TL and improving touch sensitivity of the touch line TL. Note that the number of the first contact holes CH1 corresponding to each reflective segment 13S and the number of the second contact holes CH2 corresponding to each reflective segment 13S are not limited to the example shown in the drawing(s) (three respectively).

When there are a plurality of first contact holes CH1 that correspond to each reflective segment 13S, any one of this plurality of first contact holes CH1 is preferably formed in a different location from another one of the first contact holes CH1 in a plan view. This particular structure allows for redundancy in the electrical connection between the reflective segment 13 and the touch sensor electrode TX and also enables restraining an uneven display that shows small black dots. With a view to restraining uneven displays, any one of the plurality of first contact holes CH1 is preferably separated from another one of the first contact holes CH1 by an equivalent of one or more pixels in one or both of the row direction and the column direction.

When there are a plurality of second contact holes CH2 that correspond to each reflective segment 13S, any one of this plurality of second contact holes CH2 is preferably formed in a different location from another one of the second contact holes CH2 in a plan view. This particular structure allows for redundancy in the electrical connection between the reflective segment 13S and the touch line TL and also enables restraining an uneven display that shows small black dots. With a view to restraining uneven displays, any one of the plurality of second contact holes CH2 is preferably separated from another one of the second contact holes CH2 by an equivalent of one or more pixels in one or both of the row direction and the column direction.

If at least one of the first contact holes CH1 corresponding to each reflective segment 13S and at least one of the contact holes in the at least one second contact hole CH2 are located between adjacent pixel electrodes PE in the plurality of pixel electrodes PE, reflectance can be improved in a white display.

At least one of the plurality of touch lines TL preferably overlaps a region between adjacent reflective segments 13S in a plan view. This particular structure enables reducing the loads of the touch lines TL, thereby allowing for improvement in touch sensitivity.

A region R1 between adjacent touch sensor electrodes TX in the plurality of touch sensor electrodes TX (see FIG. 3; hereinafter, may be referred to as a "first region") preferably overlaps a region R2 between adjacent pixel electrodes PE in the plurality of pixel electrodes PE (see FIG. 3; hereinafter, may be referred to as a "second region") in a plan view. This particular structure enables equalizing the parasitic capacitance of the pixel electrodes PE and improving lattice-like uneven displays.

In addition, in the present embodiment, the plurality of touch lines TL adjoin the bottom face of the reflective layer 13 via the first interlayer insulating layer 12, and the plurality of pixel electrodes PE adjoin the top face of the reflective layer 13 via the second interlayer insulating layer 14. This particular structure enables reducing, for example, the number of masks and processes required in the manufacture of the liquid crystal display device 100, thereby allowing for cost reduction. For example, as described in the example, when each touch line TL is disposed between adjacent source lines SL, the number of masks and processes can be reduced by forming the touch lines TL from the same conductive film as the source lines SL. Note that the touch lines TL may extend, in the row direction (in the same direction as the gate lines GL), and each touch line TL may be disposed between adjacent gate lines GL. In such a case, the number of masks and processes can be reduced by forming the touch lines TL from the same conductive film as the gate lines GL (i.e., in the same layer as the gate lines GL).

When the reflective layer 13 (i.e., each reflective segment 13S) has an irregular surface structure as in the present embodiment, the second interlayer insulating layer 14 preferably has a thickness that is greater than the difference in height of the irregular surface structure of each reflective segment 13S. If there exists an irregular shape that reflects the irregular surface structure of the reflective segments 13S on the surface of the TFT substrate 10 on the liquid crystal layer 30 side (on the interface between the TFT substrate 10 and the liquid crystal layer 30), the cell thickness (thickness of the liquid crystal layer 30) could be rendered non-uniform, which may decrease the contrast ratio. Since the second interlayer insulating layer 14 having a thickness that is greater than the difference in height of the irregular surface structure of the reflective segments 13S enables the second interlayer insulating layer 14 to planarize the irregular surface structure of the reflective segments 13S, the irregular surface structure of the reflective segments 13S is less reflected by the surface of the TFT substrate 10 on the liquid crystal layer 30 side, which enables restraining decreases in the contrast ratio caused by a non-uniform cell thickness. Note that a light scattering sheet may be used instead of providing an irregular surface structure to the reflective segments 13S (e.g., a light scattering sheet may be disposed on the viewer side of the opposite substrate 20). Even in such a case, however, decreases in contrast can still occur depending on the specifications of the light scattering sheet used.

With a view to restraining decreases in the contrast ratio caused by a non-uniform cell thickness, the second interlayer insulating layer 14 preferably has a thickness that is greater than or equal to twice the difference in height of the irregular surface structure. In addition, the irregular surface structure of the reflective segments 13S would not be completely planarized depending on the thickness of the second interlayer insulating layer 14. In such a case, the top face of the portion of the second interlayer insulating layer 14 that overlaps the irregular surface structure of the reflective segments 13S has an irregular shape, and the difference in height of the irregular shape is preferably less than or equal to half the difference in height of the irregular surface structure of the reflective segments 13S.

Note that the example here shows the common electrode CE being provided above the pixel electrode PE. Alternatively, contrary to this, the pixel electrode PE may be provided above the common electrode CE as will be detailed later in Embodiment 3. In the following description, either one of the pixel electrode PE and the common electrode CE that is located relatively above the other may be referred to as the "upper electrode," and either one of the pixel electrode PE and the common electrode CE that is located relatively below the other may be referred to as the "lower electrode." The upper electrode and the lower electrode are adjacent to each other via the dielectric layer 15. To generate an in-plane electric field, at least the upper electrode includes, in each pixel P, a plurality of stripe-like portions and at least one slit that is provided between two adjacent stripe-like portions.

In addition, in the liquid crystal display device 100 in accordance with the present embodiment, a display is produced in in-plane electric field mode in which the liquid crystal layer 30 is twist-aligned in the absence of applied voltage. More specifically, a display is produced in FFS mode ("TW-FFS mode") in which the liquid crystal layer 30 is twist-aligned in the absence of applied voltage. Hence, the contrast ratio of the reflective display can be improved over a case where a display is produced in an ordinary FFS mode in which the liquid crystal layer 30 is not twist-aligned in the absence of applied voltage (i.e., the liquid crystal layer 30 has a twist angle of) 0°. With a view to improving the contrast ratio, the liquid crystal layer 30 preferably has a twist angle of from 45° to 90° both inclusive in the absence of applied voltage.

Furthermore, in the present embodiment, the reflective layer 13 is located between the liquid crystal layer 30 and the TFTs 11 and at least partially overlaps the TFTs 11 in a plan view. This particular structure allows for increasing the reflective aperture ratio, enabling a brighter reflective display. In addition, the TFTs 11 can be protected from external light, which improves reliability.

In the configuration in which the touch sensor electrodes TX are electrically connected to the touch lines TL via the reflective segments 13S as in the present embodiment, substantially equal voltages (touch drive signals) may be substantially simultaneously applied to all the reflective segments 13S in touch detection mode. Alternatively, substantially equal voltages (touch drive signals) may be substantially simultaneously applied to a group of pixel electrodes PE located in the same pixel row or in the same pixel column and to one or more of the reflective segments 13S overlapping that group in a plan view.

Figure 5:
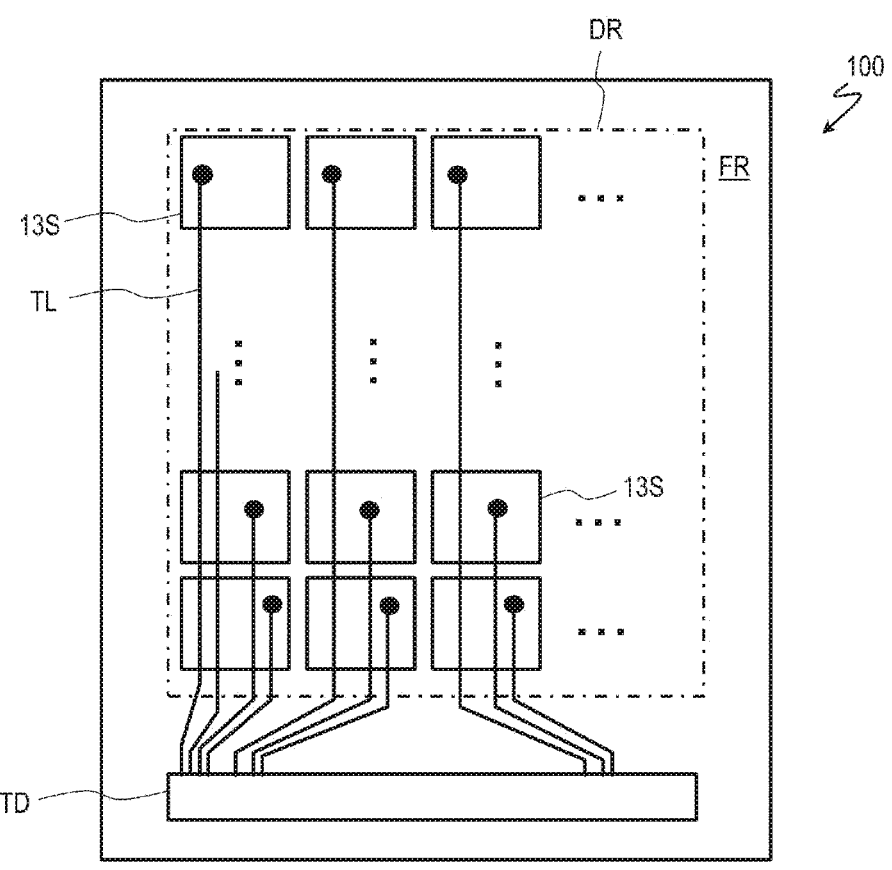
FIG. 5 is a plan view of an arrangement relationship
between reflective segments 13S and touch lines TL in the
liquid crystal display device 100.

FIG. 5 is a plan view of an exemplary arrangement relationship between the reflective segments 13S and the touch lines TL in the liquid crystal display device 100.

Referring to FIG. 5, the liquid crystal display device 100 has a display area DR and a non-display area FR. The display area DR is specified by the plurality of pixels P (see FIG. 2) arranged in a matrix. The non-display area FR is disposed along the periphery of the display area DR and may be referred to as the "peripheral region" or the "frame area."

In the display area DR, the reflective layer 13 is divided into the plurality of reflective segments 13S. Each reflective segment 13S is electrically connected to an associated one of the touch lines TL.

The touch lines TL are connected to a touch-drive unit TD provided in the non-display area FR. The touch-drive unit TD is configured, for example, to switch in time division between a display mode in which the plurality of touch sensor electrodes TX are caused to function as the common electrode CE and a touch detection mode in which the plurality of touch sensor electrodes TX are caused to function as the touch sensor electrodes TX. The touch-drive unit TD applies a common signal to the reflective segments 13S through the touch lines TL in the display mode. Meanwhile, in the touch detection mode, the touch-drive unit TD applies a touch drive signal to the reflective segments 13S through the touch lines TL.

Note that the non-display area FR includes, as well as the touch-drive unit TD, peripheral circuitry (not shown) including drive circuits such as a gate driver for supplying a gate signal to the gate lines GL and a source driver for supplying a source signal to the source lines SL. These drive circuits, for example, may be mounted to the TFT substrate 10 or may be formed integrally (monolithically). A semiconductor chip including all or some of the drive circuits may be mounted to the non-display area FR.

Figure 6:
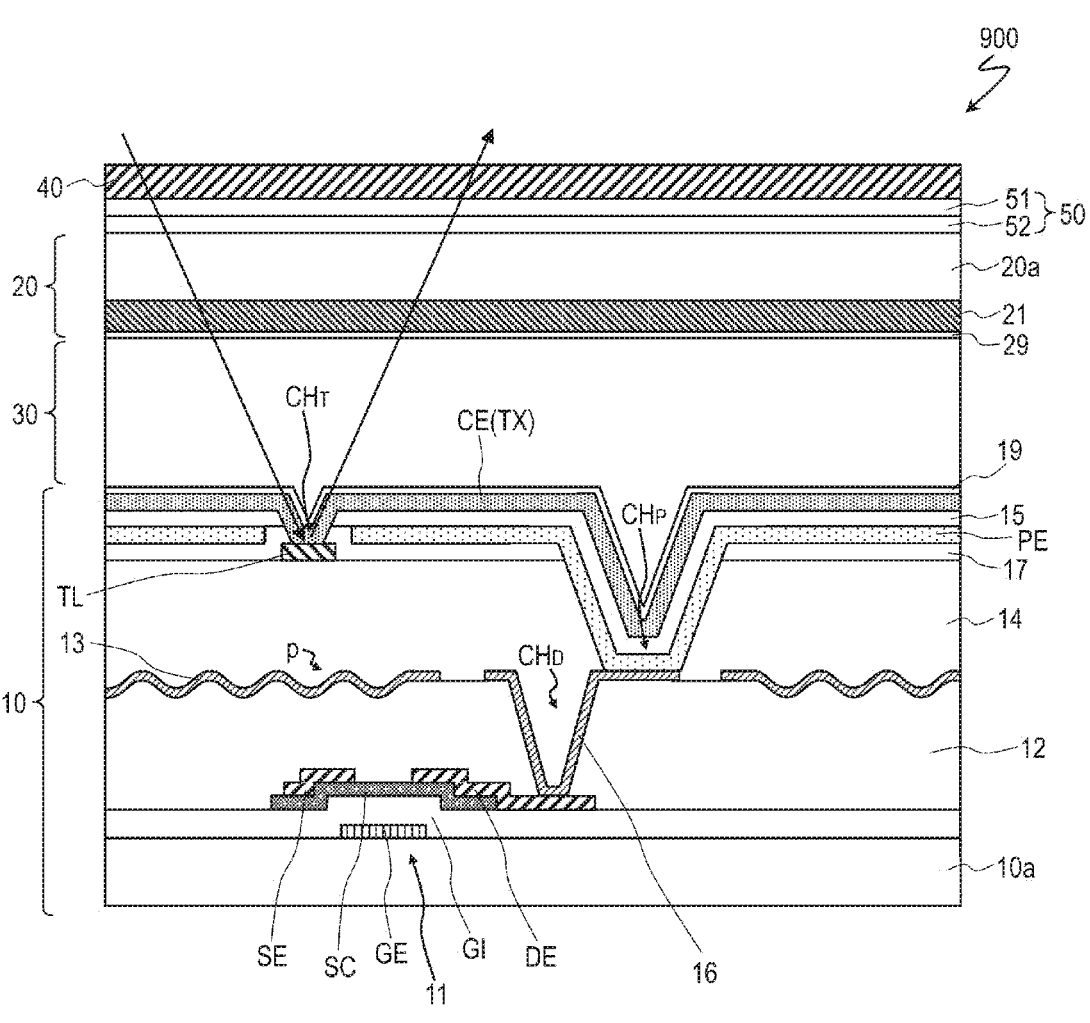
FIG. 6 is a schematic cross-sectional view of a liquid
crystal display device 900 in accordance with a comparative
example.

A description is now given of advantages of the liquid crystal display device 100 in accordance with the present embodiment over a liquid crystal display device 900 in accordance with a comparative example shown in FIG. 6. The liquid crystal display device 900 in accordance with the comparative example is a simple application of the configuration of a transmissive in-cell type touch panel to a reflective liquid crystal display device with a double-electrode structure. Throughout the following description, structural elements of the liquid crystal display device 900 in accordance with the comparative example that have the same the same function as structural elements of the liquid crystal display device 100 in accordance with the present embodiment are indicated by the same reference numerals, and description thereof may be omitted.

The liquid crystal display device 900 in accordance with the comparative example differs from the liquid crystal display device 100 in accordance with the present embodiment in that the touch lines TL are provided on the second interlayer insulating layer 14. The touch lines TL of the liquid crystal display device 900 are covered by a dielectric layer 17 other than the dielectric layer 15 disposed between the pixel electrode PE and the common electrode CE (touch sensor electrodes TX), and the pixel electrode PE is provided on this dielectric layer 17. Then, the touch lines TL are connected to the touch sensor electrodes TX in contact holes $CH_T$ formed in the dielectric layers 15 and 17. In the liquid crystal display device 900 in accordance with the comparative example, the reflective layer 13 is not divided into a plurality of reflective segments that are electrically independent from each other.

In the liquid crystal display device 900 in accordance with the comparative example, the touch lines TL are provided on the second interlayer insulating layer 14 and located on the viewer side of the reflective layer 13. Therefore, the glare of the reflective display may increase due to regular reflection by the touch lines TL, and the reflective aperture ratio may decrease. Reflective display quality could fall in the liquid crystal display device 900 in accordance with the comparative example as described here.

In contrast, in the liquid crystal display device 100 in accordance with the present embodiment, the touch lines TL are provided between the gate insulating layer GI and the first interlayer insulating layer 12 and located on the rear side of the reflective layer 13. Therefore, decreases in reflective display quality are restrained.

In addition, in the liquid crystal display device 900 in accordance with the comparative example, for example, the number of masks and processes required in manufacture may significantly increase, which could increase cost. In the liquid crystal display device 900 in accordance with the comparative example, for example, a conductive film needs to be deposited and patterned or the dielectric layer 17 needs to be deposited and patterned (to form openings that will be parts of the contact holes CH$_T$), to form the touch lines TL.

In contrast, the liquid crystal display device 100 in accordance with the present embodiment includes no dielectric layer that would correspond to the dielectric layer 17 in the liquid crystal display device 900 in accordance with the comparative example, and no masks or processes are needed to form such a dielectric layer. In addition, if the touch lines TL are made from the same conductive film as the source lines SL or from the same conductive film as the gate lines GL, there is no need for additional masks or processes to form the touch lines TL. Therefore, for example, the number of masks and processes required in manufacture can be reduced, which allows for cost reduction.

Embodiment 2

Figure 7:
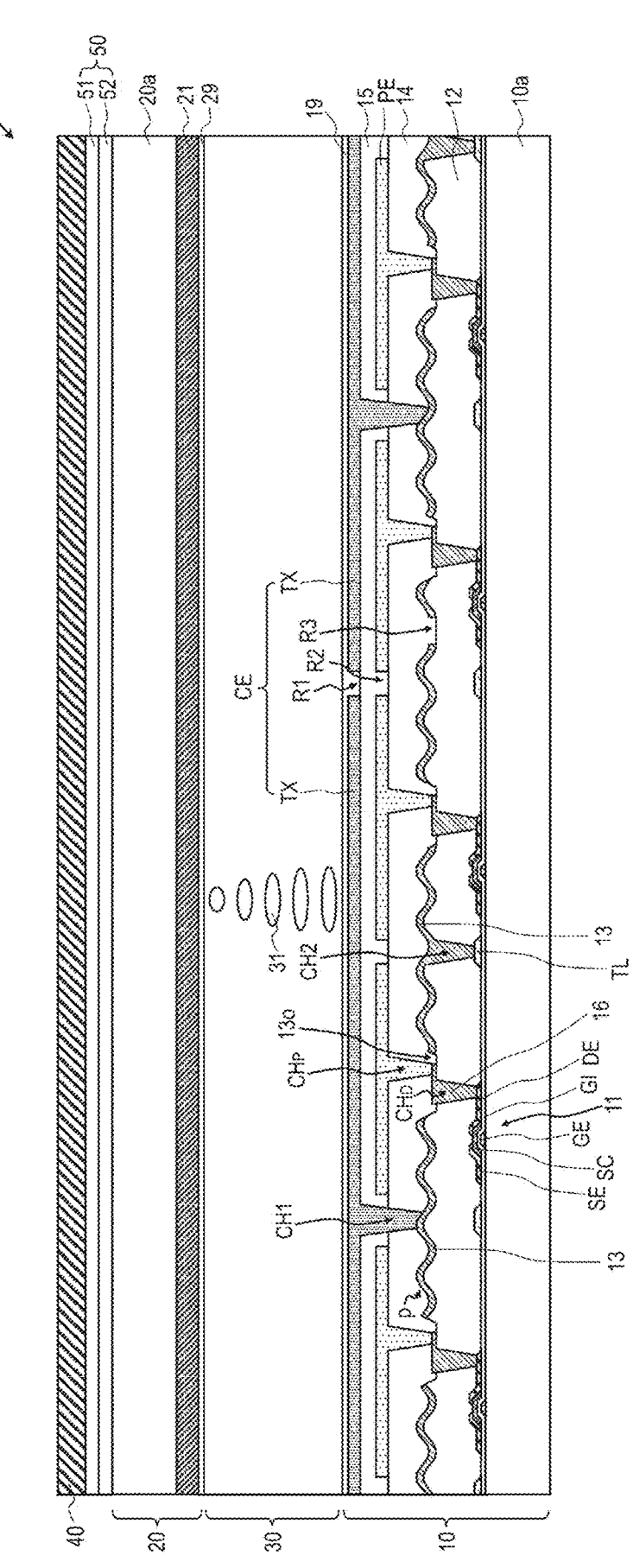
FIG. 7 is a schematic cross-sectional view of another
liquid crystal display device 200 in accordance with an
embodiment of the disclosure.

A description is given of a liquid crystal display device 200 in accordance with the present embodiment with reference to FIG. 7. FIG. 7 is a schematic cross-sectional view of the liquid crystal display device 200. The following description will focus on differences of the liquid crystal display device 200 in accordance with the present embodiment from the liquid crystal display device 100 in accordance with Embodiment 1.

In the liquid crystal display device 100 in accordance with Embodiment 1, a region (first region) R1 between adjacent touch sensor electrodes TX overlaps a region R3 between adjacent reflective segments 13S (hereinafter, may be referred to as a "third region") in a plan view, as shown in FIG. 3.

In contrast, in the liquid crystal display device 200 in accordance with the present embodiment, the first region R1 does not completely overlap the third region R3 in a plan view as shown in FIG. 7. In other words, each reflective segment 13S overlaps the first region R1 in a plan view. In the example shown in the drawing, each reflective segment 13S overlaps the first region R1 also in the region (second region) R2 between adjacent pixel electrodes PE in a plan view. As described here, the adverse effects of an irregular electric field on the display can be reduced in the first region R1 if the first region R1 does not completely overlap the third region R3 in a plan view.

Embodiment 3

Figure 8:
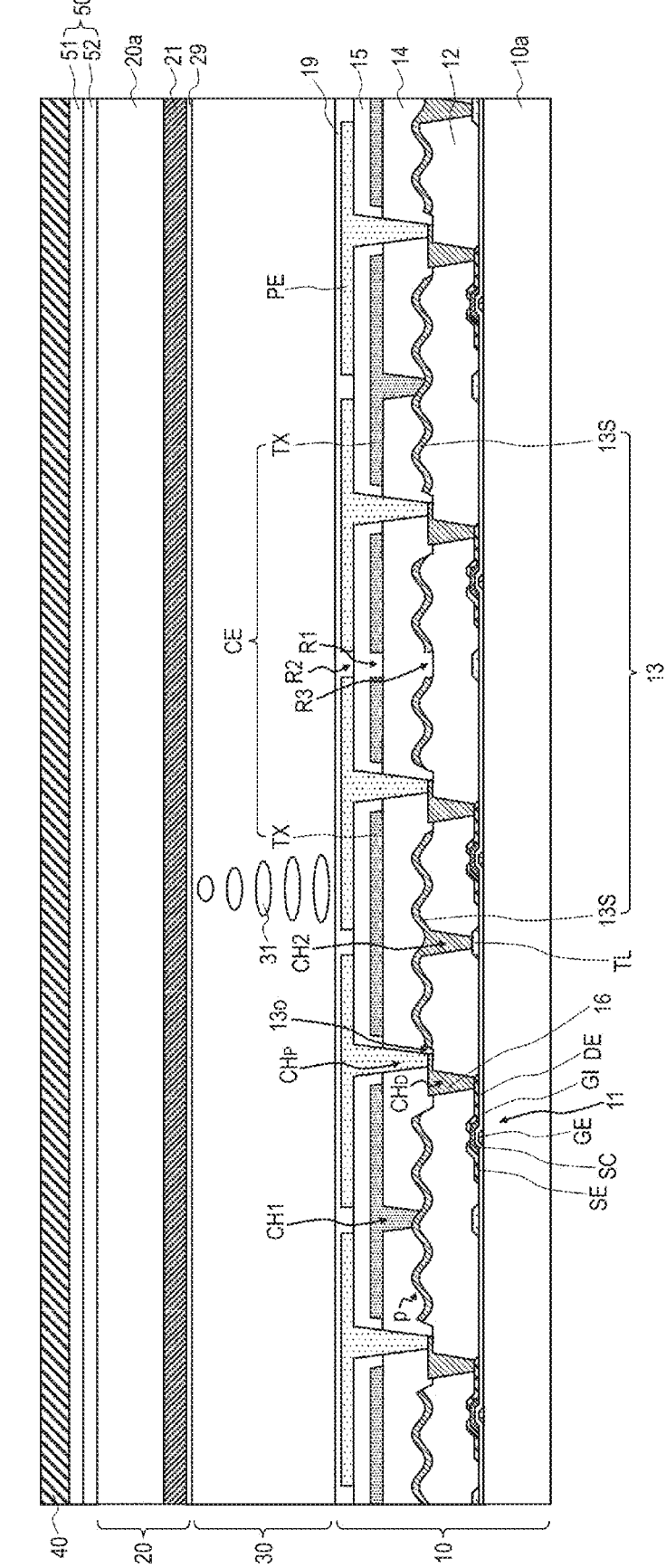
FIG. 8 is a schematic cross-sectional view of a further
liquid crystal display device 300 in accordance with an
embodiment of the disclosure.
Figure 9A:
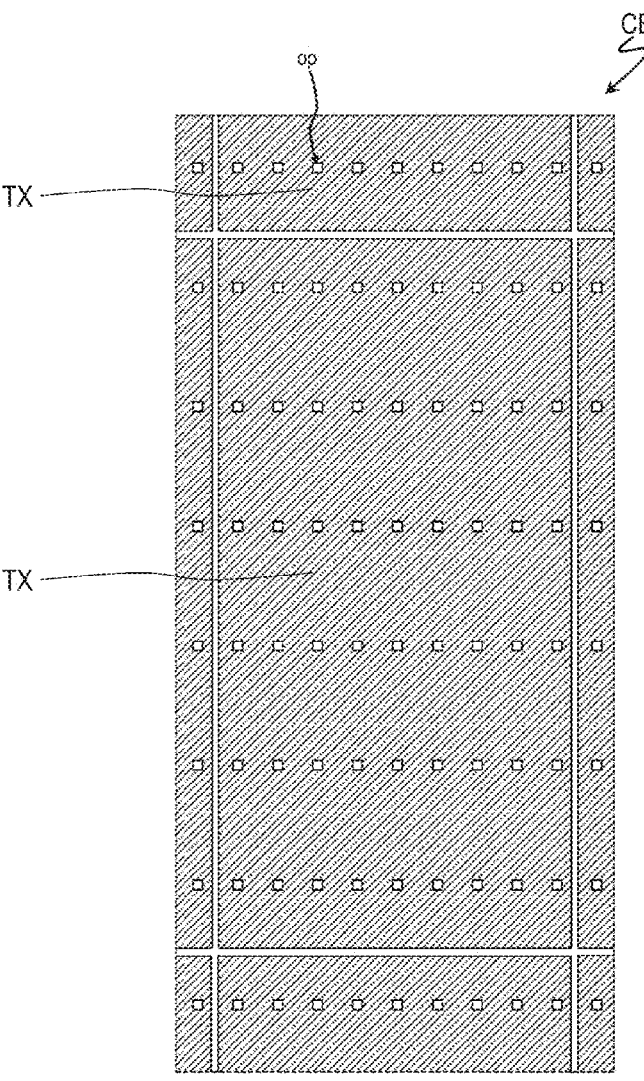
FIG. 9A is a schematic plan view of a common electrode
CE in the TFT substrate 10 in the liquid crystal display
device 300.
Figure 9B:
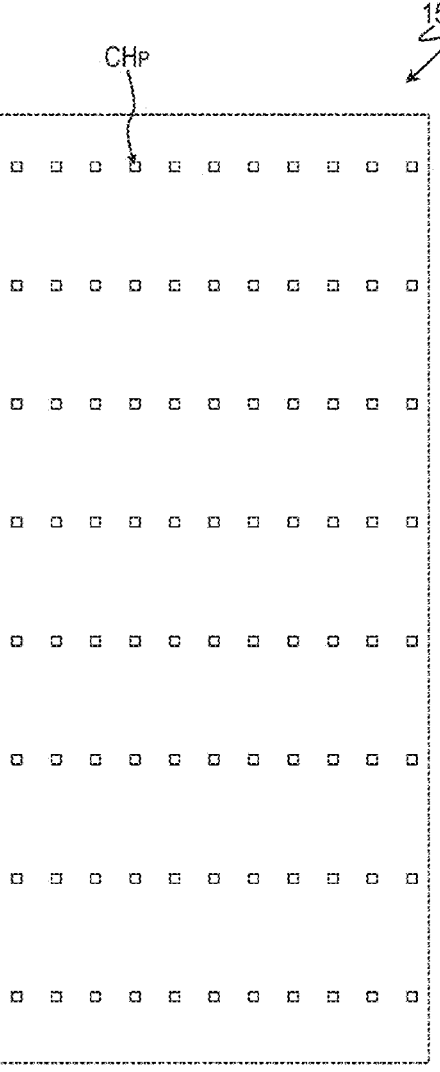
FIG. 9B is a schematic plan view of a dielectric layer 15
in the TFT substrate 10 in the liquid crystal display device
300.
Figure 9C:
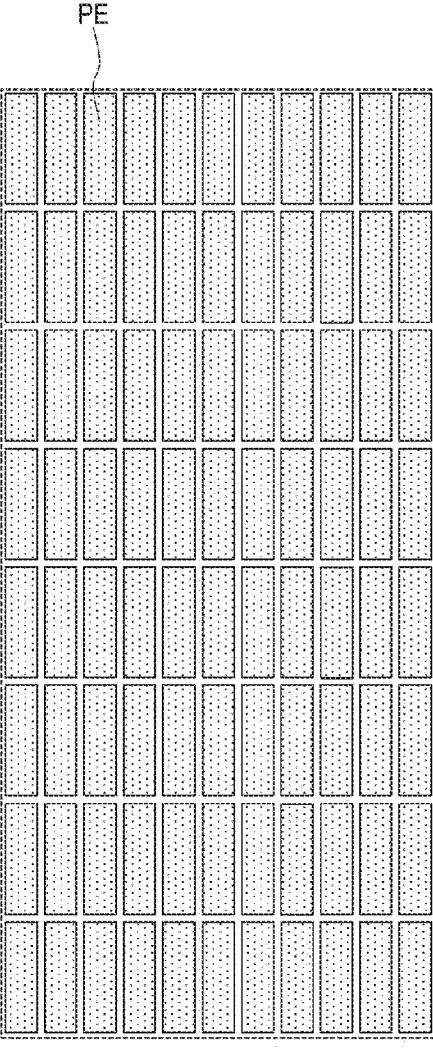
FIG. 9C is a schematic plan view of a pixel electrode PE
in the TFT substrate 10 in the liquid crystal display device
300.

A description is now given of a liquid crystal display device 300 in accordance with the present embodiment with reference to FIG. 8 and FIGS. 9A to 9C. FIG. 8 is a schematic cross-sectional view of the liquid crystal display device 300. FIGS. 9A to 9C are schematic plan views of the common electrode CE, the dielectric layer 15, and the pixel electrode PE in the TFT substrate 10 in the liquid crystal display device 300. For the back plane circuit BP, the first interlayer insulating layer 12, the reflective layer 13, and the second interlayer insulating layer 14, refer to FIGS. 4A to 4D as these members can be configured in the same manner as in the liquid crystal display device 100 in accordance with Embodiment 1.

The common electrode CE is disposed above the pixel electrode PE in the liquid crystal display device 100 in accordance with in accordance with Embodiment 1. In contrast, the pixel electrode PE is disposed above the common electrode CE in the liquid crystal display device 300 in accordance with the present embodiment as shown in FIG. 8.

The common electrode CE is provided on the second interlayer insulating layer 14. Therefore, the plurality of touch sensor electrodes TX adjoin the top face of the reflective layer 13 via the second interlayer insulating layer 14. Each touch sensor electrode TX is connected to an associated one of the reflective segments 13S in the first contact hole CH1 formed in the second interlayer insulating layer 14. The dielectric layer 15 is provided so as to cover the common electrode CE, and the pixel electrode PE is provided on the dielectric layer 15. The pixel electrode PE is connected to the contact electrode 16 in the pixel contact hole CHp formed across both the dielectric layer 15 and the second interlayer insulating layer 14. An opening op is formed in a region of the common electrode CE that overlaps the pixel contact hole CHp. In the present embodiment, the reflective layer 13 is again located opposite the liquid crystal layer 30 with respect to the pixel electrode PE and the common electrode CE (i.e., closer to the rear side than the pixel electrode PE and the common electrode CE). In addition, the pixel electrode PE and the common electrode CE may be described as being provided between the second interlayer insulating layer 14 and the first horizontal alignment film 19, and the dielectric layer 15 can be described as being provided between the second interlayer insulating layer 14 and the first horizontal alignment film 19. In the present embodiment, the common electrode CE is provided between the second interlayer insulating layer 14 and the dielectric layer 15, and the pixel electrode PE is provided between the dielectric layer 15 and the first horizontal alignment film 19.

Note that the pixel electrode PE includes a plurality of stripe-like portions and at least one slit located between two adjacent stripe-like portions (not shown in FIGS. 8 and 9C). Since the slit is formed in the pixel electrode PE, a fringe electric field is generated across the liquid crystal layer 30 in accordance with the electrical potential difference between the pixel electrode PE and the common electrode CE.

Similarly to the liquid crystal display device 100 in accordance with Embodiment 1, the reflective layer 13 in the liquid crystal display device 300 in accordance with the present embodiment is also divided into the plurality of reflective segments 13S which are electrically independent from each other. Therefore, the loads of the touch sensor electrodes TX (the parasitic capacitance formed by the touch sensor electrodes TX and the reflective segments 13S) can be reduced.

Note that as described above, at least the pixel electrode PE has a slit in the structure in which the pixel electrode PE is disposed above the common electrode CE, and at least the common electrode CE has a slit in the structure in which the common electrode CE is disposed above the pixel electrode PE.

In a relatively large liquid crystal display device (i.e., the pixels P have a relatively large area), the pixel electrode PE is preferably disposed above the common electrode CE. In the structure in which the pixel electrode PE is disposed above the common electrode CE, increases in the resistivity (area resistivity) of the common electrode CE are restrained when compared with the structure in which the common electrode CE is disposed above the pixel electrode PE because there is no need to form a slit in the common electrode CE. If the resistivity of the common electrode CE increases, the rate of electric charge supply to the common electrode CE may fall, and defects (e.g., flickering and shadow) may be more likely to occur in the display of an image that requires large electric charge supply to the common electrode CE (e.g., a checkered pattern, a stripe pattern, or an image partially including these patterns, in which the pixels dominantly assume either one of the polarities, rather than the other polarity).

Note that in the structure in which the pixel electrode PE is disposed above the common electrode CE, there is a need to form a slit in the pixel electrode PE, and the resistivity of the pixel electrode PE therefore increases. However, the pixel electrode PE has a sufficiently smaller area than the common electrode CE (e.g., by no more than a millionth) and for this reason, needs less charge supply. In addition, because electric charges are supplied from the TFTs 11 connected to the respective pixels, the adverse affect of the display image has less influence, and defects are less likely develop in producing the display.

Note that in the structure in which the pixel electrode PE is disposed above the common electrode CE, it is impossible to provide the slit for generating a fringe electric field in the pixel electrode PE in the region where the pixel contact hole CHP is formed, and furthermore, it is necessary to provide the opening op in the common electrode CE in that region. Therefore, no effective fringe electric field can be generated in the region, thereby contributing nothing to the reflective display, and the reflectance could decrease over the structure in which the common electrode CE is disposed above the pixel electrode PE. Since those regions that do not contribute to the reflective display, such as the contact holes, occupy some area regardless of the magnitude of the area of the pixel P, the proportion of the regions that do not contribute to the reflective display in the pixels P increases with a decrease in the area of the pixel P (i.e., with an increase in definition), and the above-described decrease in reflectance increases. Conversely, in a relatively large liquid crystal display device, it is easier to lower the proportion of the regions that do not contribute to the reflective display in the pixels P, and the above-described decrease in reflectance is more easily restrained. For these reasons, in a relatively large (the pixels P have a relatively large area) liquid crystal display device, the structure in which the pixel electrode PE is disposed above the common electrode CE is advantageous.

In addition, as described above, the decrease in reflectance caused by the lack of contribution to the reflective display from the regions in which the pixel contact holes CHP are formed grows with a decrease in the area of the pixel P (i.e., with an increase in definition). Therefore, the common electrode CE is preferably disposed above the pixel electrode PE in a relatively high definition (i.e., the area of the pixel P is relatively small) liquid crystal display device.

Embodiment 4

Figure 10:
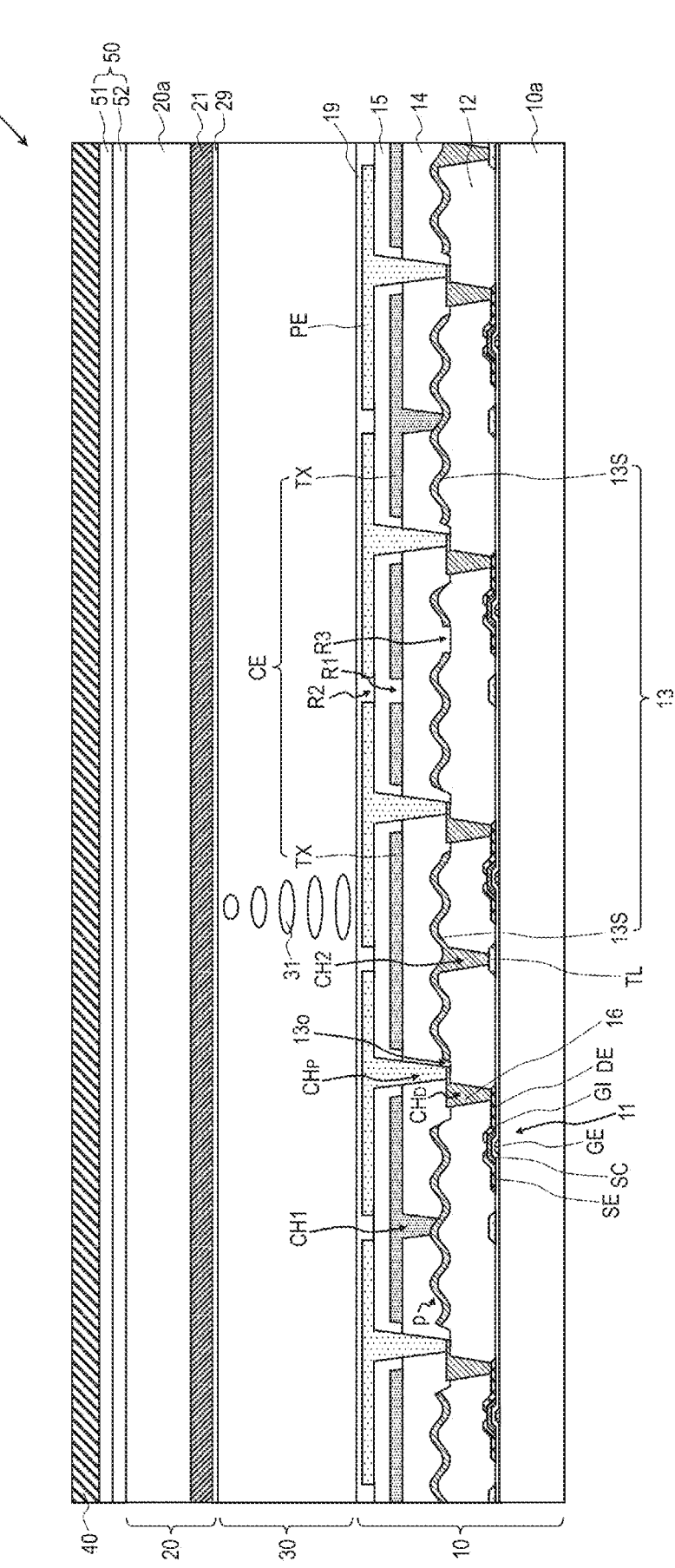
FIG. 10 is a schematic cross-sectional view of yet another
liquid crystal display device 400 in accordance with an
embodiment of the disclosure.

A description is given of a liquid crystal display device 400 in accordance with the present embodiment with reference to FIG. 10. FIG. 10 is a schematic cross-sectional view of the liquid crystal display device 400. The following description will focus on differences of the liquid crystal display device 400 in accordance with the present embodiment from the liquid crystal display device 300 in accordance with Embodiment 3.

In the liquid crystal display device 300 in accordance with Embodiment 3, a region (first region) R1 between adjacent touch sensor electrodes TX overlaps a region (third region) R3 between adjacent reflective segments 13S in a plan view, as shown in FIG. 8.

In contrast, in the liquid crystal display device 400 in accordance with the present embodiment, the first region R1 does not completely overlap the third region R3 in a plan view as shown in FIG. 10. In other words, each reflective segment 13S overlaps the first region R1 in a plan view. In the example shown in the drawing, each reflective segment 13S overlaps the first region R1 also in the region (second region) R2 between adjacent pixel electrodes PE in a plan view. As described here, the adverse effects of an irregular electric field on the display can be reduced in the first region R1 if the first region R1 does not completely overlap the third region R3 in a plan view.

Slit in Upper Electrode

As described above, at least the upper electrode among the pixel electrode PE and the common electrode CE has at least one single slit.

Figure 11A:
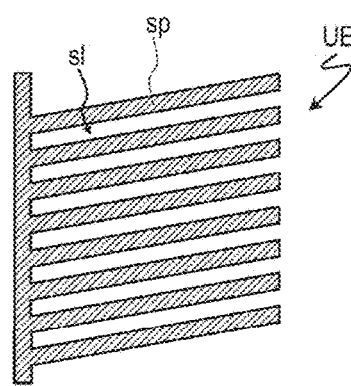
FIG. 11A is a plan view of an exemplary upper electrode
UE.

FIG. 11A shows an exemplary upper electrode UE. The upper electrode UE shown in FIG. 11A includes a plurality of stripe-like portions sp and a plurality of slits sl. Note that needless to say, the number of the stripe-like portions sp and the number of the slits sl are not limited to those in the example shown in FIG. 11A.

Figure 11B:
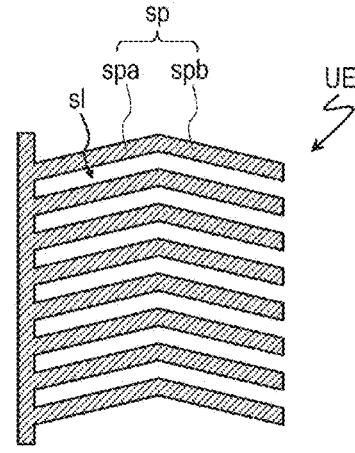
FIG. 11B is a plan view of another exemplary upper
electrode UE.

FIG. 11B shows another exemplary upper electrode UE. Similarly to example shown in FIG. 11A, the upper electrode UE shown in FIG. 11B includes a plurality of stripe-like portions sp and a plurality of slits sl. In addition, in the example shown in FIG. 11B, each stripe-like portion sp includes a first portion spa extending in a direction (first direction) and a second portion spb extending in a direction other than the first direction (second direction). The upper electrode UE with this structure forms two liquid crystal domains with different alignment directions in each pixel under applied voltage (which hereinafter will be referred to as "dual domain alignment"), thereby enabling restraining, for example, changes in color (undesirably tinted display) and in gray levels that could result from a change in the viewing angle direction.

Figure 11C:
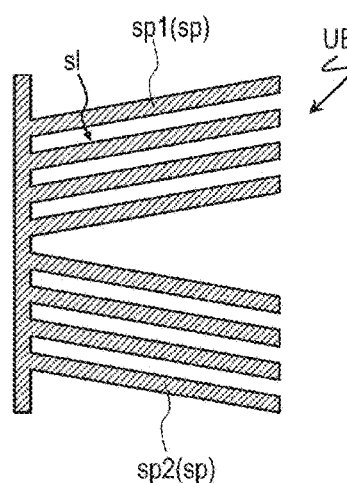
FIG. 11C is a plan view of a yet another exemplary upper
electrode UE.

FIG. 11C shows yet another exemplary upper electrode UE. Similarly to the example shown in FIGS. 11A and 11B, the upper electrode UE shown in FIG. 11C includes a plurality of stripe-like portions sp and a plurality of slits sl. In addition, in the example shown in FIG. 11C, the plurality of stripe-like portions sp include at least one first stripe-like portion sp1 (in this example, four first stripe-like portions sp1) extending in a direction (first direction) and at least one second stripe-like portion sp2 (in this example, four second stripe-like portions sp2) extending in a direction other than the first direction (second direction). The upper electrode UE with this structure also forms the dual domain alignment.

Reflective Layer

The reflective layer 13 may have a layered structure that includes a metal layer and a transparent conductive layer. A description is given of an example of a preferred structure when the reflective layer 13 has such a layered structure, with reference to FIG. 12.

Figure 12:
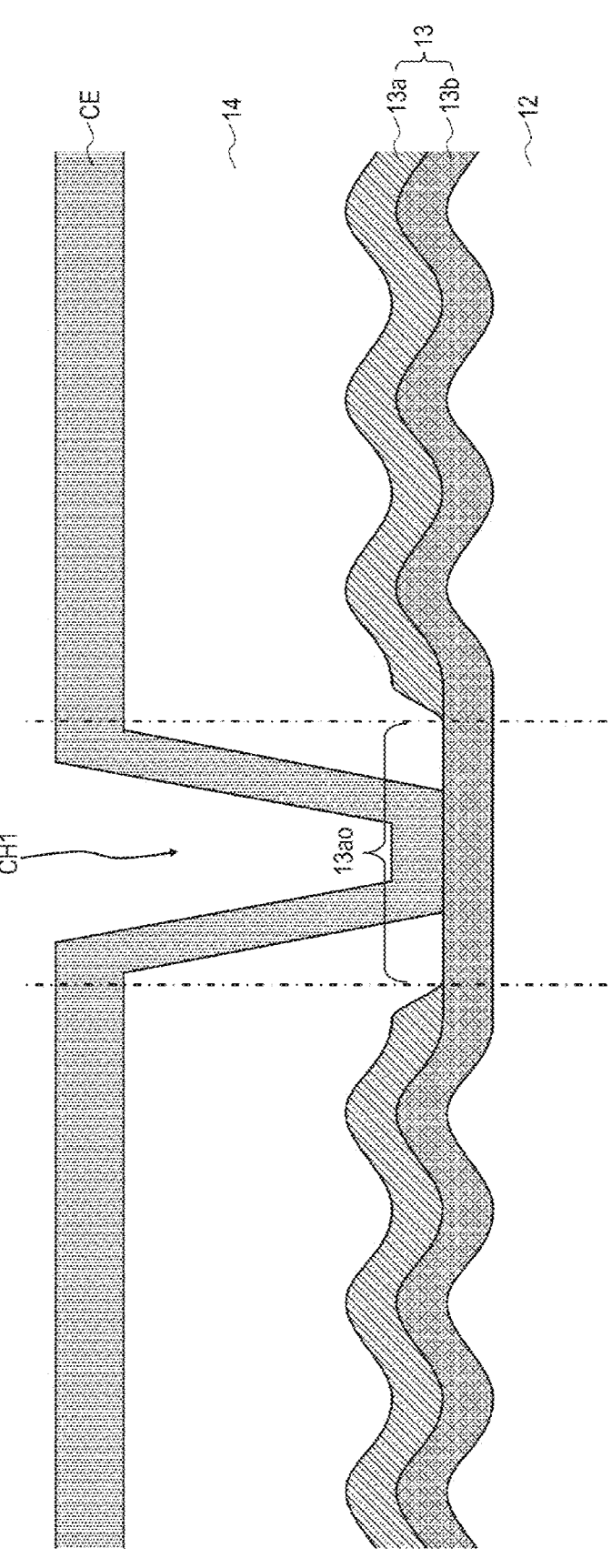
FIG. 12 is a cross-sectional view of an exemplary pre-
ferred structure of a reflective layer 13 that has a layered
structure including a metal layer 13a and a transparent
conductive layer 13b.

In the example shown in FIG. 12, the reflective layer 13 includes a transparent conductive layer 13*b* formed from a transparent conductive material and a metal layer 13*a* provided on the transparent conductive layer 13*b* and formed from a metal material. The metal layer 13*a* has at least one opening 13*ao*, and the transparent conductive layer 13*b* is formed so as to have a portion thereof overlapping the opening 13*ao* in the metal layer 13*a*.

For example, the number of the openings 13*ao* in the metal layer 13*a* is the same as the number of the first contact holes CH1, that is, the openings 13*ao* are formed corresponding to the first contact holes CH1. Referring to FIG. 12, the first contact holes CH1 overlap the corresponding openings 13*ao* when viewed normal to the display screen. In other words, in the region where the common electrode CE is connected to the reflective layer 13, the metal material for the metal layer 13*a* is removed, and a common electrode 13 is connected to the transparent conductive layer 13*b*.

Near the first contact holes CH1, for example, the cell thickness and fringe electric field differ from other regions, and therefore the alignment becomes irregular. Particularly in the black display state, the irregular alignment causes undesirable whitish (or grayish) glow near the first contact holes CH1, which could disadvantageously lower the contrast ratio. Referring to FIG. 12, the overlapping of the first contact holes CH1 over the openings 13*ao* in the metal layer 13*a* enables restraining the contrast ratio from decreasing due to the irregular alignment near the first contact holes CH1.

Figure 13:
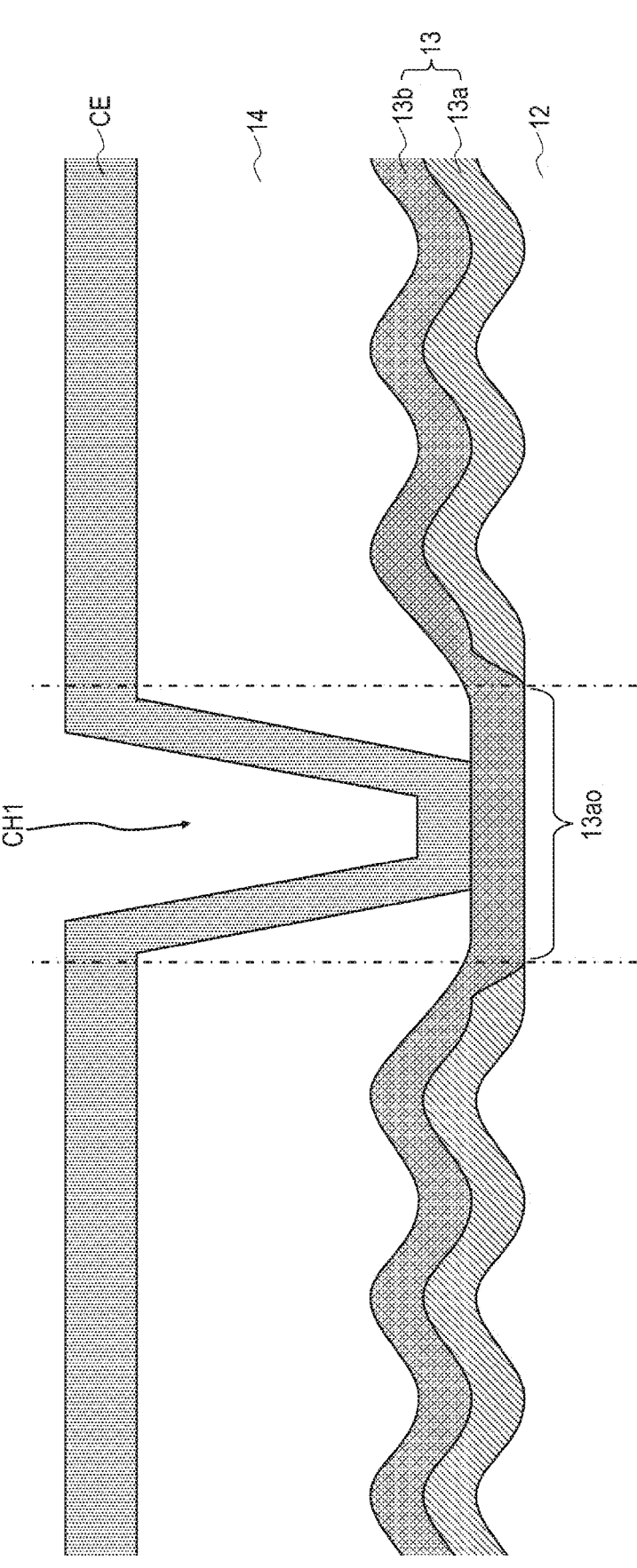
FIG. 13 is a cross-sectional view of an exemplary pre-
ferred structure of the reflective layer 13 that has a layered
structure including the metal layer 13a and the transparent
conductive layer 13b.

Note that although FIG. 12 shows a layered structure in which the metal layer 13*a* is provided on the transparent conductive layer 13*b*, the transparent conductive layer 13*b* may be provided on the metal layer 13*a* as shown in FIG. 13. In the example shown in FIG. 13, the overlapping of the first contact holes CH1 over the openings 13*ao* in the metal layer 13*a* again enables restraining the contrast ratio from decreasing.

Although FIGS. 12 and 13 show an example in which the reflective layer 13 has a layered structure in the configuration in which the common electrode CE is provided below the pixel electrode PE, the reflective layer 13 may, needless to say, have a layered structure in a configuration in which the common electrode CE is provided above the pixel electrode PE.

Oxide Semiconductor TFTs

The TFT 11 in each pixel P may preferably be, for example, an oxide semiconductor TFT (unarguably, there are other possibilities too). In an oxide semiconductor TFT, an active layer is made of an oxide semiconductor. In other words, the oxide semiconductor TFT includes an oxide semiconductor layer as an active layer. Oxide semiconductors have been attracting attention as promising active layer materials that can replace, for example, amorphous silicon and polycrystalline silicon.

The oxide semiconductor has higher mobility than amorphous silicon. Therefore, the oxide semiconductor TFT is capable of operating at higher speed than the amorphous silicon TFT. In addition, since the oxide semiconductor layer can be formed by a simpler and more convenient process than the polycrystalline silicon layer, the oxide semiconductor TFT is applicable to devices that are required to provide a large area.

Furthermore, since the oxide semiconductor TFT has excellent off-leak characteristics, a driving method may be employed by which a display is produced with a relatively low image rewrite frequency. For example, when displaying a still image, the oxide semiconductor TFT may operate in such a manner that image data is rewritten at a frequency of once per second. Such a driving method is termed, for example, dormant drive or low-frequency drive and is capable of significantly reducing the power consumption of the liquid crystal display device.

Employment of dormant drive and a touch detection performed in a period when images are not rewritten enable restraining decreases in the sensitivity of touch operation caused by noise from the drive circuit, which can increase the S/N ratio (signal-to-noise ratio) by, for example, 10 folds over conventional cases.

In addition, since the oxide semiconductor TFT is also advantageous in reducing the size of TFTs, a structure in which a memory circuit is provided for each pixel P (called "MIP" (memory in pixels)) can be suitably realized. Specific MIP structures are publicly known, and description thereof may be omitted here.

The oxide semiconductor contained in the active layer (oxide semiconductor layer) of an oxide semiconductor TFT may be an amorphous oxide semiconductor or a crystalline oxide semiconductor that has a crystal portion. Examples of the crystalline oxide semiconductor include polycrystalline oxide semiconductor, microcrystal oxide semiconductor, and crystalline oxide semiconductor in which the c-axis is generally perpendicular to the layer plane.

The oxide semiconductor layer may have layered structure including two or more layers. The oxide semiconductor layer with a layered structure may include an amorphous oxide semiconductor layer and a crystalline oxide semiconductor layer and may include a plurality of crystalline oxide semiconductor layers with different crystalline structures. In addition, the oxide semiconductor layer with a layered structure may include a plurality of amorphous oxide semiconductor layers. When the oxide semiconductor layer has a two-layered structure of an upper layer and a lower layer, the oxide semiconductor in the lower layer and the oxide semiconductor in the upper layer may have different energy gaps.

Japanese Unexamined Patent Application Publication No. 2014-007399, as an example, describes, for example, the material, structure, film-forming method, and the structure of the oxide semiconductor layer with a layered structure for the amorphous oxide semiconductor and the crystalline oxide semiconductor. The entire contents of the disclosure of Japanese Unexamined Patent Application Publication No. 2014-007399 are incorporated in the present specification for reference.

The oxide semiconductor layer may contain, for example, at least one of metal elements of In, Ga, and Zn. In the present embodiment, the oxide semiconductor layer contains, for example, an In—Ga—Zn—O-based semiconductor (e.g., an indium gallium zinc oxide). Here, the In—Ga—Zn—O-based semiconductor is a ternary oxide of In (indium), Ga (gallium), and Zn (zinc) and is not limited in any particular manner in the ratio (composition ratio) of In, Ga, and Zn. The ratio may be, for example, In:Ga:Zn=2:2:1, In:Ga:Zn=1:1:1, or In:Ga:Zn=1:1:2. Such an oxide semiconductor layer 11 can be formed from an oxide semiconductor film containing an In—Ga—Zn—O-based semiconductor.

The In—Ga—Zn—O-based semiconductor may be either amorphous or crystalline. The crystalline In—Ga—Zn—O-based semiconductor is preferably a crystalline In—Ga—Zn—O-based semiconductor in which the c-axis is generally perpendicular to the layer plane.

Note that the crystal structure of the crystalline In—Ga—Zn—O-based semiconductor is disclosed in, for example, Japanese Unexamined Patent Application Publication No. 2014-007399 described above, Japanese Unexamined Patent Application Publication No. 2012-134475, and Japanese Unexamined Patent Application Publication No. 2014-209727. The entire contents of the disclosure of Japanese Unexamined Patent Application Publication No. 2012-134475 and Japanese Unexamined Patent Application Publication No. 2014-209727 are incorporated in the present specification for reference. TFTs including an In—Ga—Zn—O-based semiconductor layer have high mobility (more than 20 times that of a-SiTFTs) and low leakage current (less than $\frac{1}{100}$ that of a-SiTFTs) and can for these reasons be suitably used as drive TFTs (e.g., TFTs in a drive circuit provided around the display area having a plurality of pixels on the same substrate as the display area) and pixel TFTs (TFTs in pixels).

The oxide semiconductor layer may contain an oxide semiconductor other than the In—Ga—Zn—O-based semiconductor in place of the In—Ga—Zn—O-based semiconductor. The oxide semiconductor layer may contain, for example, an In—Sn—Zn—O-based semiconductor (e.g., $In_2O_3$—$SnO_2$—ZnO; InSnZnO). The In—Sn—Zn—O-based semiconductor is a ternary oxide of In (indium), Sn (tin), and Zn (zinc). Alternatively, the oxide semiconductor layer 11 may contain, for example, an In—Al—Zn—O-based semiconductor, an In—Al—Sn—Zn—O-based semiconductor, a Zn—O-based semiconductor, an In—Zn—O-based semiconductor, a Zn—Ti—O-based semiconductor, a Cd—Ge—O-based semiconductor, a Cd—Pb—O-based semiconductor, CdO (cadmium oxide), a Mg—Zn—O-based semiconductor, an In—Ga—Sn—O-based semiconductor, an In—Ga—O-based semiconductor, a Zr—In—Zn—O-based semiconductor, a Hf—In—Zn—O-based semiconductor, an Al—Ga—Zn—O-based semiconductor, a Ga—Zn—O-based semiconductor, or an In—Ga—Zn—Sn—O-based semiconductor.

Transflective Liquid Crystal Display Device

Figure 14:
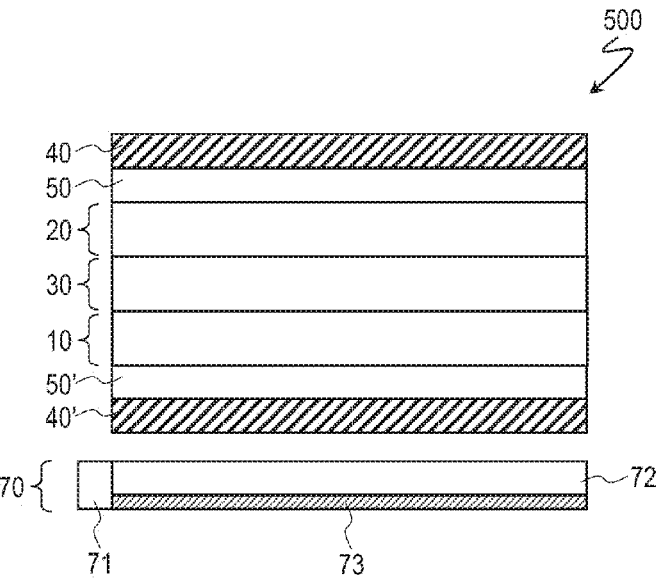
FIG. 14 is a schematic cross-sectional view of still another
liquid crystal display device 500 in accordance with an
embodiment of the disclosure.

The description has so far discussed the liquid crystal display devices 100, 200, 300, and 400 which are all reflective. Alternatively, the liquid crystal display device in accordance with an embodiment of the disclosure may be transflective. A description is now given of a structure of a transflective liquid crystal display device 500 with reference to FIG. 14.

The liquid crystal display device 500 differs from the liquid crystal display devices 100, 200, 300, and 400 in that the liquid crystal display device 500 includes another polarizer 40', another phase difference layer 50', and a lighting device (backlight) 70.

The polarizer 40' is disposed closer to the rear side than the liquid crystal layer 30. More specifically, the polarizer 40' is disposed closer to the rear side than the TFT substrate 10.

The phase difference layer 50' is disposed between the polarizer 40' and the liquid crystal layer 30. More specifically, the phase difference layer 50' is disposed between the polarizer 40' and the TFT substrate 10. The phase difference layer 50 may include, for example, a $\lambda/2$ plate and a $\lambda/4$ plate.

The lighting device 70 is disposed on the rear side of the polarizer 40' (on the rear side of the TFT substrate 10). In the example shown in the drawing(s), the lighting device 70 includes: a light source that emits light (e.g., an LED) 71, a light-guide plate 72 that directs the light emitted by the light source 71 toward the polarizer 40' side; and a reflector 73 disposed on the rear side of the light-guide plate 72. The lighting device 70 may further include a prism sheet and a diffusion sheet both on the front side (or on the rear side) of the light-guide plate 72.

Figure 15:
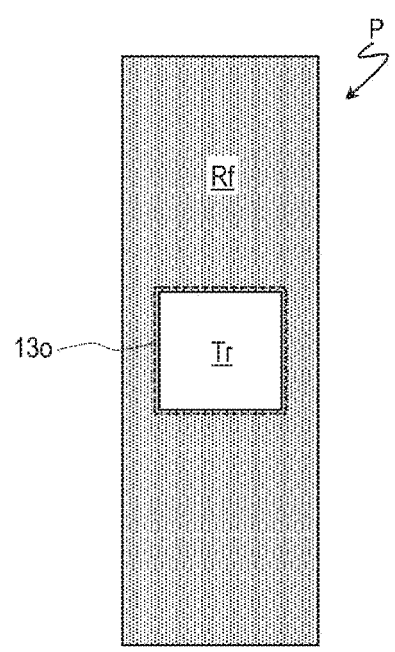
FIG. 15 illustrates a reflection region Rf and a transmis-
sion region Tr in each pixel P in the liquid crystal display
device 500.

Each pixel P in the liquid crystal display device 500 has a reflection region Rf for producing a display in reflection mode and a transmission region Tr for producing a display in transmission mode as shown in FIG. 15. The reflective layer 13 (each reflective segment 13S) of the TFT substrate 10 has the opening 130 in the transmission region Tr. The proportion of the area of the transmission region Tr in the pixel P may be specified in a suitable manner in accordance with, for example, usage and may be, for example, from 20% to 90% both inclusive. In addition, for example, the location of the transmission region Tr in the pixel P and the shape of the transmission region Tr may also be specified in a suitable manner in accordance with, for example, usage.

INDUSTRIAL APPLICABILITY

The disclosure, in an embodiment thereof, can provide a pixel structure suitable for liquid crystal display devices capable of displaying in reflection mode and also capable of being used as an in-cell type touch panel. The disclosure, in an embodiment thereof, can be suitably used in reflective and transflective liquid crystal display devices.

While there have been described what are at present considered to be certain embodiments of the disclosure, it will be understood that various modifications may be made thereto, and it is intended that the appended claim cover all such modifications as fall within the true spirit and scope of the disclosure.

What is claimed is:

1. A liquid crystal display device comprising:
   a first substrate;
   a second substrate closer to a viewer side than the first substrate;
   a liquid crystal layer between the first substrate and the second substrate;
   a polarizer closer to the viewer side than the liquid crystal layer;
   a phase difference layer between the polarizer and the liquid crystal layer; and
   a plurality of pixels arranged in a matrix of a plurality of rows and a plurality of columns, wherein
   each of the plurality of pixels includes a reflection region in which a display is produced in a reflection mode,
   the first substrate includes:
      a plurality of gate lines extending in a row direction,
      a plurality of source lines extending in a column direction,
      a plurality of thin film transistors, each provided corresponding to each of the plurality of pixels,
      a plurality of pixel electrodes, each electrically connected to a corresponding one of the plurality of thin film transistors, a reflective layer made of a conductive material and located in at least the reflection region, and opposite the liquid crystal layer, with respect to the plurality of pixel electrodes, a plurality of touch sensor electrodes to each of which different signals are applicable, and a plurality of touch lines, each electrically connected to a corresponding one of the plurality of touch sensor electrodes, the reflective layer is divided into a plurality of reflective segments that are electrically independent from each other, each of the plurality of reflective segments overlaps two or more of the plurality of pixel electrodes in a plan view, different voltages are applicable to the plurality of reflective segments, each of the plurality of reflective segments is electrically connected to the corresponding one of the plurality of touch sensor electrodes and to a corresponding one of the plurality of touch lines, and each of the plurality of reflective segments is electrically connected to the corresponding one of the plurality of touch sensor electrodes via at least one first contact hole and to the corresponding one of the plurality of touch lines via at least one second contact hole.

2. The liquid crystal display device according to claim 1, wherein the two or more of the plurality of pixel electrodes overlapping each of the plurality of reflective segments are arranged in the plurality of rows and the plurality of columns.

3. The liquid crystal display device according to claim 1, wherein the plurality of reflective segments is equal, in number, to, or greater, in number, than, the plurality of touch sensor electrodes.

4. The liquid crystal display device according to claim 1, wherein the at least one first contact hole comprises a plurality of first contact holes, and/or the at least one second contact hole comprises a plurality of second contact holes.

5. The liquid crystal display device according to claim 1, wherein the at least one first contact hole is provided, in the plan view, in a different location than the at least one second contact hole.

6. The liquid crystal display device according to claim 5, wherein any one of the at least one first contact hole is separated, by an equivalent of one or more pixels, from each of the at least one second contact hole in at least one of the row direction and the column direction.

7. The liquid crystal display device according to claim 1, wherein the at least one first contact hole comprises a plurality of first contact holes, and any one of the plurality of first contact holes is provided, in the plan view, in a different location than another one of the plurality of first contact holes.

8. The liquid crystal display device according to claim 7, wherein any one of the plurality of first contact holes is separated, by an equivalent of one or more pixels, from another one of the plurality of first contact holes in at least one of the row direction and the column direction.

9. The liquid crystal display device according to claim 1, wherein the at least one second contact hole comprises a plurality of second contact holes, and any one of the plurality of second contact holes is provided, in the plan view, in a different location than another one of the plurality of second contact holes.

10. The liquid crystal display device according to claim 9, wherein any one of the plurality of second contact holes is separated, by an equivalent of one or more pixels, from another one of the plurality of second contact holes in at least one of the row direction and the column direction.

11. The liquid crystal display device according to claim 1, wherein at least one of the at least one first contact hole and the at least one second contact hole is located between adjacent pixel electrodes in the plurality of pixel electrodes.

12. The liquid crystal display device according to claim 1, wherein at least one of the plurality of touch lines overlaps a region between adjacent reflective segments in the plurality of reflective segments in the plan view.

13. The liquid crystal display device according to claim 1, wherein a region between adjacent touch sensor electrodes in the plurality of touch sensor electrodes overlaps, in the plan view, a region between adjacent pixel electrodes in the plurality of pixel electrodes.

14. The liquid crystal display device according to claim 1, wherein each of the plurality of reflective segments overlaps a region between adjacent touch sensor electrodes in the plurality of touch sensor electrodes and a region between adjacent pixel electrodes in the plurality of pixel electrodes in a plan view.

15. The liquid crystal display device according to claim 1, wherein each of the plurality of touch lines is disposed either between adjacent gate lines in the plurality of gate lines or between adjacent source lines in the plurality of source lines.

16. The liquid crystal display device according to claim 1, wherein the plurality of touch lines is formed from a same conductive film as either the plurality of gate lines or the plurality of source lines.

17. The liquid crystal display device according to claim 1, wherein each of the plurality of pixels includes a transmission region in which a display is produced in transmission mode, each of the plurality of reflective segments has an opening in the transmission region, and the liquid crystal display device includes:

a light source and another polarizer both closer to a rear side than the first substrate; and another phase difference layer between the other polarizer and the liquid crystal layer.

18. The liquid crystal display device according to claim 1, wherein the plurality of touch sensor electrodes is adjacent to the plurality of pixel electrodes via a dielectric layer, and at least one of the plurality of touch sensor electrodes and the plurality of pixel electrodes have at least one slit.

19. The liquid crystal display device according to claim 1, wherein the first substrate further includes a first horizontal alignment film in contact with the liquid crystal layer, the second substrate includes a second horizontal alignment film in contact with the liquid crystal layer, the liquid crystal layer is twist-aligned in absence of an applied voltage, and the liquid crystal layer has a twist angle from 45° to 90°, both inclusive, in absence of the applied voltage.

20. The liquid crystal display device according to claim 1, wherein a substantially same voltage is applied to the plurality of reflective segments at a substantially same time.

21. The liquid crystal display device according to claim 1, wherein a substantially same voltage is applied at a substantially same time to a group of pixel electrodes, in the plurality of pixel electrodes, that is located either in a same pixel row or in a same pixel column and to one or more of the plurality of reflective segments that overlap the group of pixel electrodes in the plan view.

22. The liquid crystal display device according to claim 1, wherein the reflective layer is located between the liquid crystal layer and the plurality of thin film transistors and at least partially overlaps the plurality of thin film transistors in the plan view.

23. A liquid crystal display device comprising:
a first substrate;
a second substrate closer to a viewer side than the first substrate;
a liquid crystal layer between the first substrate and the second substrate;
a polarizer closer to the viewer side than the liquid crystal layer;
a phase difference layer between the polarizer and the liquid crystal layer; and
a plurality of pixels arranged in a matrix of a plurality of rows and a plurality of columns, wherein
each of the plurality of pixels includes a reflection region in which a display is produced in a reflection mode,
the first substrate includes:
a plurality of gate lines extending in a row direction,
a plurality of source lines extending in a column direction,
a plurality of thin film transistors, each provided corresponding to each of the plurality of pixels,
a plurality of pixel electrodes, each electrically connected to a corresponding one of the plurality of thin film transistors,
a reflective layer made of a conductive material and located in at least the reflection region, and opposite the liquid crystal layer, with respect to the plurality of pixel electrodes,
a plurality of touch sensor electrodes to each of which different signals are applicable, and
a plurality of touch lines, each electrically connected to a corresponding one of the plurality of touch sensor electrodes,
the reflective layer is divided into a plurality of reflective segments that are electrically independent from each other,
each of the plurality of reflective segments overlaps two or more of the plurality of pixel electrodes in a plan view,
the plurality of touch lines adjoins a bottom face of the reflective layer via a first insulating layer, and
the plurality of touch sensor electrodes or the plurality of pixel electrodes adjoins a top face of the reflective layer via a second insulating layer.

24. A liquid crystal display device comprising:
a first substrate;
a second substrate closer to a viewer side than the first substrate;

a liquid crystal layer between the first substrate and the second substrate;
a polarizer closer to the viewer side than the liquid crystal layer;
a phase difference layer between the polarizer and the liquid crystal layer; and
a plurality of pixels arranged in a matrix of a plurality of rows and a plurality of columns, wherein
each of the plurality of pixels includes a reflection region in which a display is produced in a reflection mode,
the first substrate includes:
a plurality of gate lines extending in a row direction,
a plurality of source lines extending in a column direction,
a plurality of thin film transistors, each provided corresponding to each of the plurality of pixels,
a plurality of pixel electrodes, each electrically connected to a corresponding one of the plurality of thin film transistors,
a reflective layer made of a conductive material and located in at least the reflection region, and opposite the liquid crystal layer, with respect to the plurality of pixel electrodes,
a plurality of touch sensor electrodes to each of which different signals are applicable, and
a plurality of touch lines, each electrically connected to a corresponding one of the plurality of touch sensor electrodes,
the reflective layer is divided into a plurality of reflective segments that are electrically independent from each other,
each of the plurality of reflective segments overlaps two or more of the plurality of pixel electrodes in a plan view,
the first substrate further includes an insulating layer formed so as to cover the plurality of reflective segments,
each of the plurality of reflective segments has an irregular surface structure,
the insulating layer has a thickness greater than a difference in height of the irregular surface structure,
a part of the insulating layer that overlaps the irregular surface structure of the plurality of reflective segments has a top face that has an irregular shape, and
the irregular shape of the insulating layer has a difference in height that is less than, or equal to, half the difference in height of the irregular surface structure of the plurality of reflective segments.

25. The liquid crystal display device according to claim 24, wherein the thickness of the insulating layer is at least twice the difference in height of the irregular surface structure.

* * * * *